US011850536B2

(12) United States Patent
Varanasi et al.

(10) Patent No.: US 11,850,536 B2
(45) Date of Patent: Dec. 26, 2023

(54) BUBBLE GAS HARVESTING AND/OR TRANSPORT METHODS AND ASSOCIATED SYSTEMS AND ARTICLES

(71) Applicant: Massachusetts Institute of Technology, Cambridge, MA (US)

(72) Inventors: Kripa K. Varanasi, Lexington, MA (US); Leonid Rapoport, Redwood City, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 395 days.

(21) Appl. No.: 16/955,210

(22) PCT Filed: Dec. 20, 2018

(86) PCT No.: PCT/US2018/066713
§ 371 (c)(1),
(2) Date: Jun. 18, 2020

(87) PCT Pub. No.: WO2019/126448
PCT Pub. Date: Jun. 27, 2019

(65) Prior Publication Data
US 2020/0338476 A1     Oct. 29, 2020

Related U.S. Application Data

(60) Provisional application No. 62/608,417, filed on Dec. 20, 2017.

(51) Int. Cl.
| | | |
|---|---|---|
| *B01D 19/00* | (2006.01) | |
| *B01D 19/02* | (2006.01) | |
| *C02F 1/20* | (2023.01) | |

(52) U.S. Cl.
CPC ......... *B01D 19/0031* (2013.01); *B01D 19/02* (2013.01); *C02F 1/20* (2013.01); *C02F 2303/12* (2013.01)

(58) Field of Classification Search
None
See application file for complete search history.

(56) References Cited

U.S. PATENT DOCUMENTS

| | | | | |
|---|---|---|---|---|
| 3,616,601 A | | 11/1971 | Senkewich | |
| 3,803,810 A | * | 4/1974 | Rosenberg | A61M 5/38 |
| | | | | 55/482 |

(Continued)

FOREIGN PATENT DOCUMENTS

| | | |
|---|---|---|
| WO | WO 2013/022467 A2 | 2/2013 |
| WO | WO 2013/130118 A1 | 9/2013 |

(Continued)

OTHER PUBLICATIONS

PCT/US2018/066713, Mar. 14, 2019, International Search Report and Written Opinion.

(Continued)

*Primary Examiner* — Christopher P Jones
*Assistant Examiner* — Phillip Y Shao
(74) *Attorney, Agent, or Firm* — Wolf, Greenfield & Sacks, P.C.

(57) ABSTRACT

Described herein are methods for transporting and/or harvesting gas from bubbles, as well as associated articles and systems. In some embodiments, transporting and/or harvesting the gas from the bubbles can reduce or prevent the amount of foam that is present within a system. According to certain embodiments, a conduit comprising a porous wall portion can be at least partially submerged into a foam and/or a bubble-containing liquid. The porous wall portion of the conduit can be configured and/or arranged, according to certain embodiments, such that the porous wall portion provides a fluidic pathway through which gas from the bubbles within the liquid may be channeled to a gaseous environment in the interior portion of the conduit. The gas may be transported, according to certain embodiments, (Continued)

along the interior portion of the conduit into an external gaseous environment and/or harvested from the interior portion of the conduit.

19 Claims, 17 Drawing Sheets

(56) References Cited

U.S. PATENT DOCUMENTS

| | | | | |
|---|---|---|---|---|
| 4,390,351 | A | * | 6/1983 | Matsui ............... B04C 1/00 55/459.3 |
| 5,989,318 | A | | 11/1999 | Schroll |
| 2005/0066812 | A1 | | 3/2005 | Vesper et al. |
| 2010/0124676 | A1 | * | 5/2010 | Meschter ........... B01D 19/0042 429/513 |
| 2013/0340840 | A1 | | 12/2013 | Anand et al. |

FOREIGN PATENT DOCUMENTS

| | | |
|---|---|---|
| WO | WO 2013/141888 A1 | 9/2013 |
| WO | WO 2013/141953 A2 | 9/2013 |
| WO | WO 2013/188702 A1 | 12/2013 |
| WO | WO 2014/078867 A1 | 5/2014 |
| WO | WO 2014/134498 A2 | 9/2014 |
| WO | WO 2015/074077 A1 | 5/2015 |
| WO | WO 2015/095660 A1 | 6/2015 |

OTHER PUBLICATIONS

PCT/US2018/066713, Jul. 2, 2020, International Preliminary Report on Patentability.

[No Author Listed], Defoamers Market Analysis By Product (Water-based, Oil-based, Silicone-based), By Application (Pulp & paper, Coatings, Agrochemicals, Water Treatment, Food & Beverages), By Region, And, Segment Forecasts, 2014-2025. Grand View Research. 2017. 10 pages.

[No Author Listed], Defoamers Market (Water Based, Silicone Based, Oil Based, and Others) Paper & Pulp, Paints & Coatings, Water Treatment, Food & Beverages, and Other End-user: Global Industry Perspective, Comprehensive Analysis, Size, Share, Growth, Segment, Trends and Forecast, 2015-2021. Zion Market Research. 2017. 22 pages.

[No Author Listed], Cost and Performance Baseline for Fossil Energy Plants vol. 1: Bituminous Coal and Natural Gas to Electricity. National Energy Technology Laboratory (NETL). Nov. 2010. 626 pages.

Aben et al., Cross continental increase in methane ebullition under climate change. Nature Communications. 2017;8:1682. Epub Nov. 22, 2017. 8 pages.

Bobji et al., Underwater Sustainability of the "Cassie" State of Wetting. Langmuir. 2009;25(20):12120-6. Epub Sep. 25, 2009.

Bocquet et al., Flow boundary conditions from nano- to microscales. Soft Matter. 2007;3:685-93. Epub Feb. 13, 2007.

Bridgham et al., Methane emissions from wetlands: biogeochemical, microbial, and modeling perspectives from local to global scales. Glob Chang Biol. May 2013;19(5):1325-46. Epub Feb. 11, 2013.

Chalmers et al., Microscopic visualization of insect cell-bubble interactions. II: The bubble film and bubble rupture. Biotechnol Prog. Mar.-Apr. 1991;7(2):151-8.

Chan et al., Film drainage and coalescence between deformable drops and bubbles. Soft Matter. 2011;7:2235-2264. Epub Dec. 3, 2010.

Cherry et al. Cell death in the thin films of bursting bubbles. Biotechnol Prog. Jan.-Feb. 1992;8(1):11-8.

De Maleprade et al., Spreading of Bubbles after Contacting the Lower Side of an Aerophilic Slide Immersed in Water. Phys Rev Lett. Aug. 26, 2016;117(9):094501. Epub Aug. 25, 2016. 5 pages.

Denkov, Mechanisms of Foam Destruction by Oil-Based Antifoams. Langmuir. May 6, 2004;20(22):9463-505. Epub Jun. 24, 2004.

Flynn et al., Underwater breathing: the mechanics of plastron respiration. J. Fluid Mech. Aug. 2008;608:275-96. Epub Jul. 11, 2008.

Hendrix et al., Spatiotemporal evolution of thin liquid films during impact of water bubbles on glass on a micrometer to nanometer scale. Phys Rev Lett. Jun. 15, 2012;108(24):247803. Epub Jun. 15, 2012. 4 pages.

Kalogirou, S. A., Seawater desalination using renewable energy sources. Prog. Energy Combust. Sci. 2005;31:242-81. Epub May 26, 2005.

Kirschke et al., Three decades of global methane sources and sinks. Nature Geoscience. 2013;6:813-23. Epub Sep. 22, 2013.

Krasowska et al., Air at hydrophobic surfaces and kinetics of three phase contact formation. Adv Colloid Interface Sci. Mar.-Jun. 2009; 147-148:155-69. Epub Nov. 1, 2008.

Li et al., Monostable superrepellent materials. PNAS. Mar. 28, 2017;114(13):3387-92. Epub Mar. 9, 2017.

Lv et al., Metastable states and wetting transition of submerged superhydrophobic structures. Physical Review Letters. May 16, 2014;112(19):196101. Epub May 12, 2014. 5 pages.

Manica et al., Force Balance Model for Bubble Rise, Impact, and Bounce from Solid Surfaces. Langmuir. Jun. 23, 2015;31(24):6763-72. Epub Jun. 9, 2015.

Marmur, Underwater Superhydrophobicity: Theoretical Feasibility. Langmuir. 2006;22:1400-2. Jan. 24, 2006.

McHale et al., Immersed superhydrophobic surfaces: Gas exchange, slip and drag reduction properties. Soft Matter. 2010;6:714-9. Epub Nov. 19, 2009.

McHale et al., Terminal velocity and drag reduction measurements on superhydrophobic spheres. Appl. Phys. Lett. 2009;94:064104. Epub Feb. 10, 2009.

Moore, The velocity of rise of distorted gas bubbles in a liquid of small viscosity. J. Fluid Mech. Dec. 1965;23(4):749-66.

Patankar, N., Thermodynamics of Trapping Gases for Underwater Superhydrophobicity. Langmuir. Jul. 12, 2016;32(27):7023-8. Epub Jun. 27, 2016.

Pelton, A review of antifoam mechanisms in fermentation. J Ind Microbiol Biotechnol. Oct. 2002;29(4):149-54.

Poetes et al., Metastable Underwater Superhydrophobicity. Physical Review Letters. 2010;105:166104. 4 pages. Epub Oct. 14, 2010.

Prins et al., Proteins and surface effects in fermentation: foam, antifoam and mass transfer. Trends in Biotechnology. Nov. 1, 1987;5(11):296-301.

Shirtcliffe et al., Plastron properties of a superhydrophobic surface. Appl. Phys. Lett. 2006;89:104106. Epub Sep. 8, 2006.

Srinivasan et al., Drag reduction for viscous laminar flow on spray-coated non-wetting surfaces. Soft Matter. 2013;9:5691-702. Epub Apr. 25, 2013.

Thorpe, Plastron respiration in aquatic insects. Biol Rev Camb Philos Soc. Jul. 1950;25(3):344-90.

Wang et al., Air Bubble Bursting Effect of Lotus Leaf. Langmuir. Dec. 15, 2009;25(24):14129-34. Epub Jul. 7, 2009.

Yong et al., Bioinspired Design of Underwater Superaerophobic and Superaerophilic Surfaces by Femtosecond Laser Ablation for Anti- or Capturing Bubbles. ACS Appl Mater Interfaces. Nov. 15, 2017;9(45):39863-71. Epub Nov. 3, 2017.

Yvon-Durocher et al., Methane fluxes show consistent temperature dependence across microbial to ecosystem scales. Nature. Mar. 27, 2014;507(7493):488-91. doi: 10.1038/nature13164. Epub Mar. 19, 2014.

Zawala et al., Dynamics of dewetting and bubble attachment to rough hydrophobic surfaces—Measurements and modelling. Miner. Eng. 2016;85:112-22. Epub Nov. 7, 2015.

International Search Report and Written Opinion dated Mar. 14, 2019 for Application No. PCT/US2018/066713.

International Preliminary Report on Patentability dated Jul. 2, 2020 for Application No. PCT/US2018/066713.

\* cited by examiner

BUBBLE GAS HARVESTING AND/OR TRANSPORT METHODS AND ASSOCIATED SYSTEMS AND ARTICLES

RELATED APPLICATIONS

This application is a national stage filing under 35 U.S.C. § 371 of International Patent Application Serial No. PCT/US2018/066713, filed Dec. 20, 2018, and entitled "Bubble Gas Harvesting and/or Transport Methods and Associated Systems and Articles," which claims priority under 35 U.S.C. § 119(e) to U.S. Provisional Application No. 62/608,417, filed Dec. 20, 2017, and entitled "Bubble Gas Harvesting and/or Transport Methods and Associated Systems and Methods," each of which is incorporated herein by reference in its entirety for all purposes.

TECHNICAL FIELD

Systems and methods for transporting and/or harvesting gas from bubbles are generally described.

SUMMARY

Described herein are methods for transporting and/or harvesting gas from bubbles, as well as associated articles and systems. In some embodiments, transporting and/or harvesting the gas from the bubbles can reduce or prevent the amount of foam that is present within a system. According to certain embodiments, a conduit comprising a porous wall portion can be at least partially submerged into a foam and/or a bubble-containing liquid. The porous wall portion of the conduit can be configured and/or arranged, according to certain embodiments, such that the porous wall portion provides a fluidic pathway through which gas from the bubbles within the liquid may be channeled to a gaseous environment in the interior portion of the conduit. The gas may be transported, according to certain embodiments, along the interior portion of the conduit into an external gaseous environment and/or harvested from the interior portion of the conduit. The subject matter of the present invention involves, in some cases, interrelated products, alternative solutions to a particular problem, and/or a plurality of different uses of one or more systems and/or articles.

In some embodiments, a method for transporting gas out of bubbles is described, wherein the method comprises at least partially submerging a conduit into a foam and/or a bubble-containing liquid, wherein the conduit comprises a porous wall portion, the porous wall portion comprising at least one submerged pore establishing a gaseous pathway from an external surface of the conduit, through the porous wall portion of the conduit, and to an internal gas passageway of the conduit, the at least one submerged pore is configured to restrict the transport of a liquid of the foam and/or the bubble-containing liquid through the wall portion, and gas from within bubbles of the foam and/or the bubble-containing liquid is transported from the bubbles, through the gaseous pathway, and into an interior of the conduit.

In certain embodiments, a system for transporting gas out of bubbles is described, comprising a foam and/or bubble-containing liquid, a source of bubbles within and/or in fluidic communication with the foam and/or bubble-containing liquid, and a conduit at least partially submerged within the foam and/or bubble-containing liquid, wherein the conduit comprises a porous wall portion, the porous wall portion comprising at least one submerged pore establishing a gaseous pathway from an external surface of the conduit, through the porous wall portion of the conduit, and to an internal gas passageway of the conduit, the at least one submerged pore is configured to restrict the transport of a liquid of the foam and/or the bubble-containing liquid through the wall portion, and the external surface of the conduit is non-wetting with respect to the liquid.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
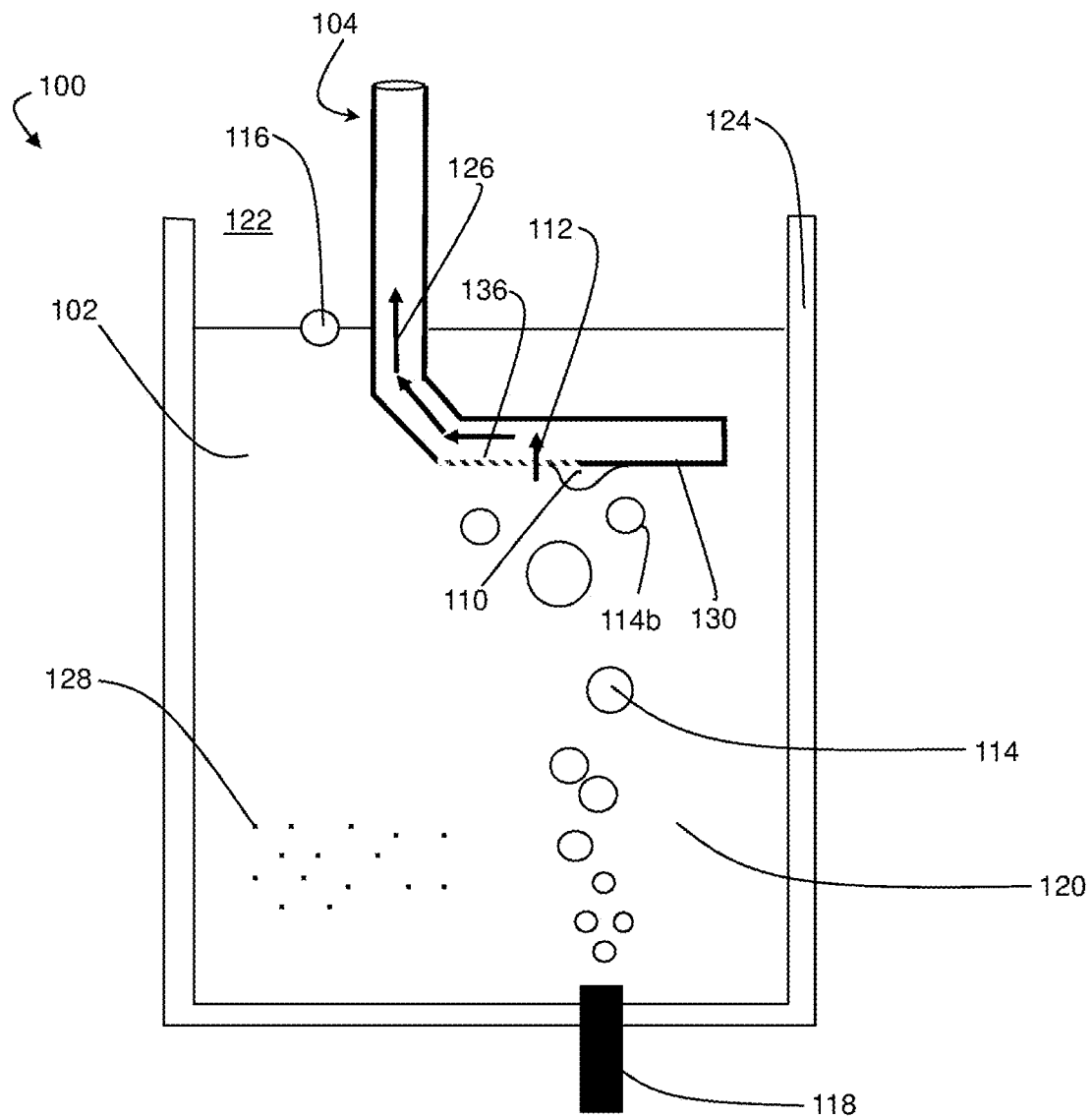
FIG. 1A is, in accordance with certain embodiments, a cross-sectional schematic diagram of a system in which a conduit comprising a porous wall portion is used to transport gas out of bubbles.

Systems and methods for transporting and/or harvesting gas from bubbles are generally described. Transporting gas out of bubbles is an important and useful tool in many manufacturing processes including water treatment, food and beverage industries, agrochemicals, and the paper industry. Many examples of liquids could benefit from the reduction and/or prevention of foam, including liquids located within reactors or external water sources such as lakes and rivers.

According to certain embodiments, conduits having certain wetting properties with respect to the liquid phase of a foam and/or bubble-containing liquid can be used to transport gas out of bubbles and redirect the gas in order to reduce and/or eliminate the volume of bubbles present within a the bubble-containing liquid and/or at the interface of a liquid and another fluid (e.g., gas and/or liquid). In some embodiments, the conduit is not wetted by the liquid phase of the bubble-containing liquid. The conduit can, in certain embodiments, interact with the gas within the bubbles of the foam and/or bubble-containing liquid such that gas within the bubbles is transported from the bubbles, into an interior of the conduit and to a gaseous environment separate from the foam and/or bubble-containing liquid in a manner such that bubbles do not accumulate to form foam. In certain cases, the conduit can interact with bubbles of already-formed foam to reduce the volume of foam that is present.

In one set of embodiments, the conduit includes a gaseous pathway from an external surface of the conduit to an internal gas passageway of the conduit via which the gas from within bubbles is removed from the bubbles and transported out of the foam and/or bubble-containing liquid. The gaseous pathway may be provided, according to certain embodiments, by pores (e.g., milliscale, microscale, and/or nanoscale pores) of the porous wall portion. According to certain embodiments, gas is retained within the pores of the porous wall portion when the conduit is submerged into a foam and/or bubble-containing liquid. The gas retained within the pores can form at least a portion of a gaseous pathway from an external surface of the conduit, through a porous wall portion of the conduit, and to an internal gas passageway of the conduit that connects submerged portions of the conduit to a gaseous environment outside the foam and/or bubble-containing liquid.

In some embodiments, when bubbles reach the external surface of the submerged portion of the conduit, the bubbles attach to the external surface of the conduit, and the external surface of the conduit breaks a liquid/gas interface of the bubble. In some such embodiments, the gas from within the bubbles merges with gas retained within the submerged pore(s). In some such cases, the gas is transported from the bubbles, along the gaseous pathway, and to the internal gas passageway of the conduit. In some such cases, the gas is transported along the internal gas passageway of the conduit (away from the foam and/or bubble-containing liquid) and into a gaseous environment outside the foam and/or bubble-containing liquid without forming a new bubble (e.g., at the interface of a foam and/or bubble-containing liquid and the gaseous environment outside of the bubble-containing liquid, and/or anywhere else along the pathway out of the liquid and/or foam).

As noted above, certain embodiments are related to systems and methods for transporting gas out of bubbles (e.g., out of bubbles present within foam and/or bubble-containing liquids). According to certain embodiments, the formation of foam can be reduced and/or prevented by transporting the gas from within bubbles of a bubble-containing liquid out of the bubble-containing liquid such that bubbles do not accumulate at an interface of the liquid and another fluid. In certain embodiments, a volume of existing foam can be reduced and/or eliminated by transporting the gas from within bubbles of an existing foam out of the foam such that the volume of the foam is reduced or eliminated.

In certain embodiments, the conduit is at least partially submerged into a foam and/or a bubble-containing liquid. FIG. 1A is, in accordance with certain embodiments, a cross-sectional schematic diagram of a system in which a conduit is used to transport gas out of bubbles. In FIG. 1A, system 100 comprises conduit 104 that is partially submerged into bubble-containing liquid 102 contained within container 124.

Figure 1B:
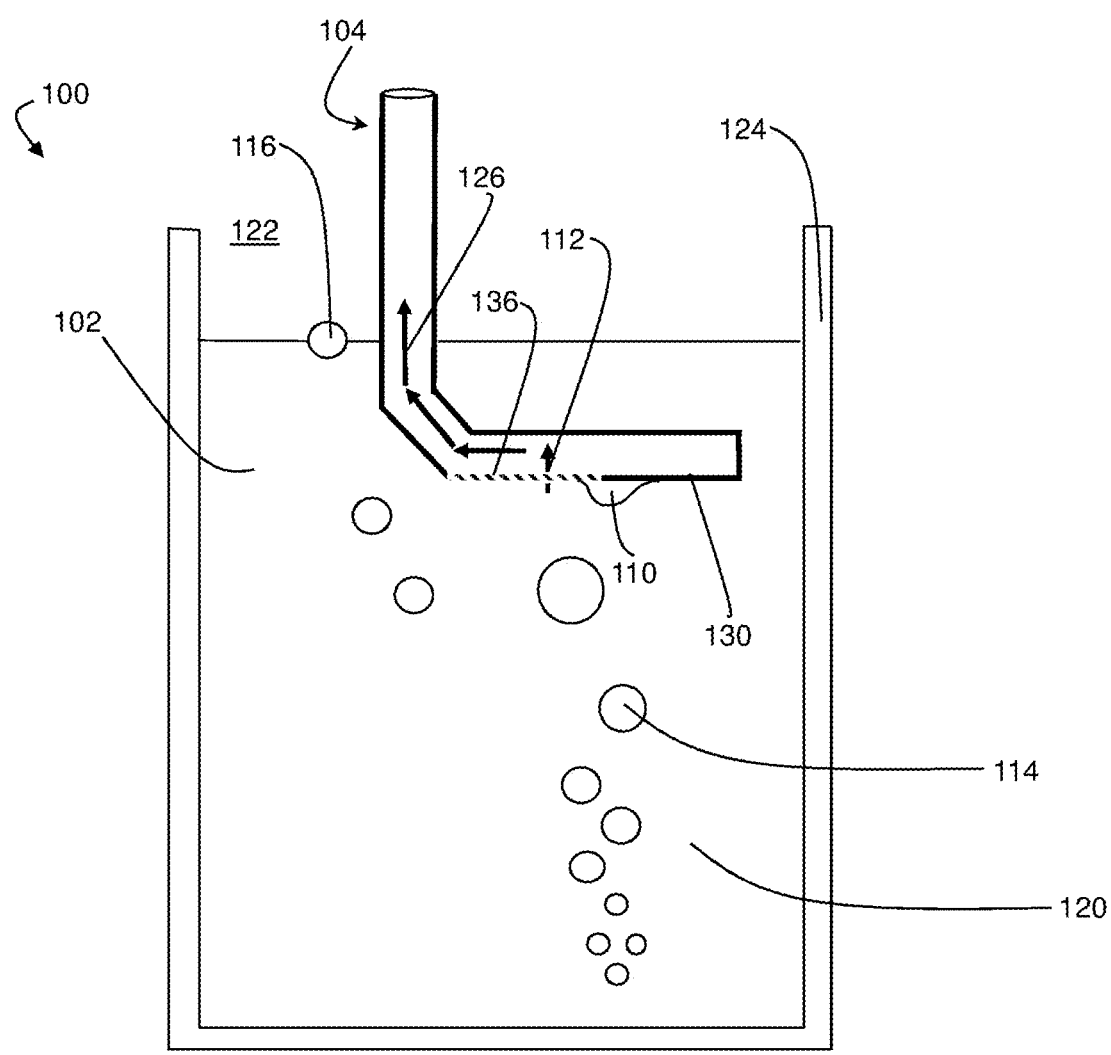
FIG. 1B, is a cross-sectional schematic diagram of a system in which a conduit comprising a porous wall portion is used to transport gas out of bubbles, according to some embodiments.
Figure 1C:
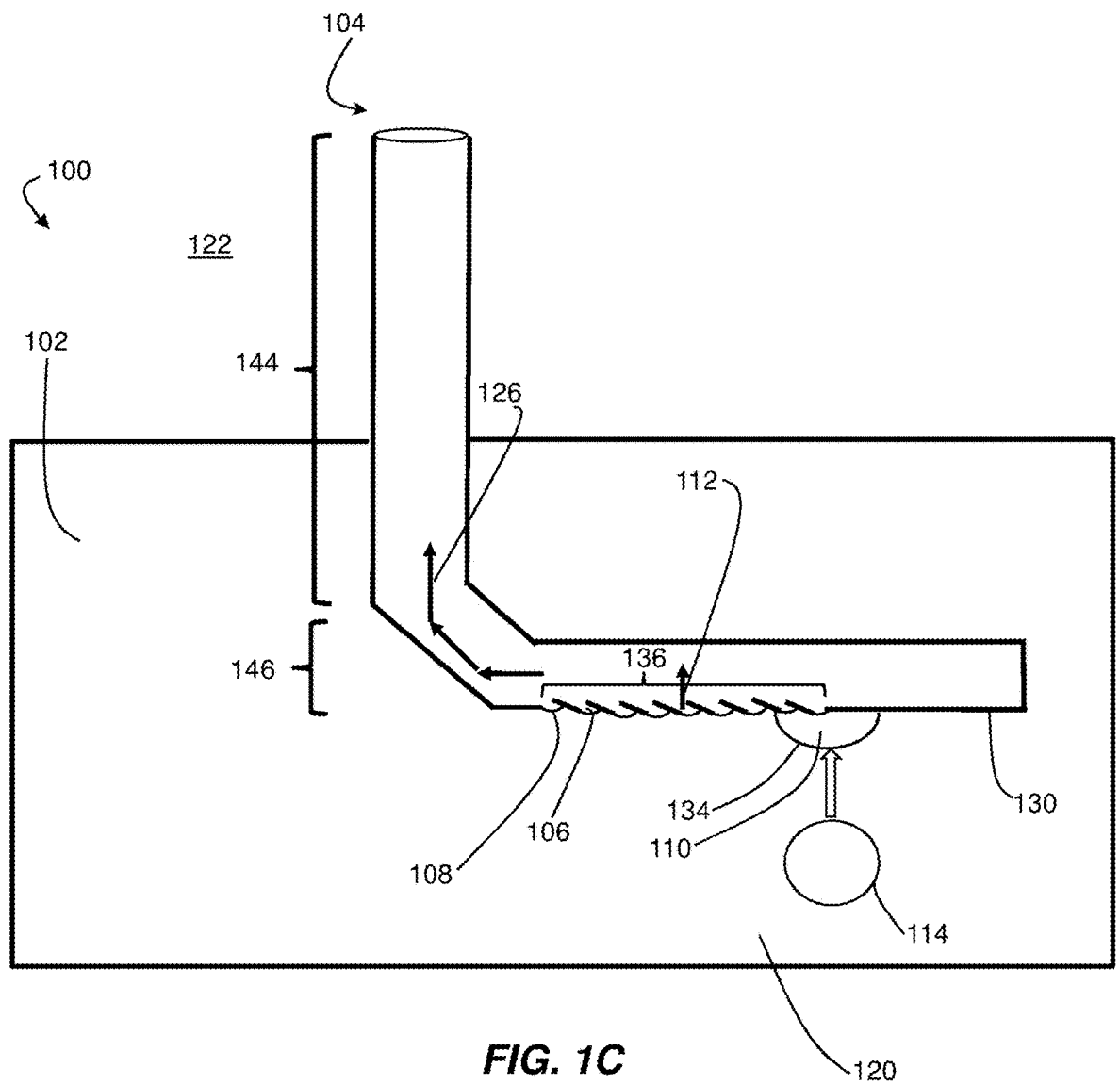
FIG. 1C is a cross-sectional schematic diagram illustrating the interaction of a bubble with a conduit comprising a porous wall portion, according to certain embodiments.

According to certain embodiments, when the conduit is at least partially submerged into the foam and/or bubble-containing liquid, the conduit can be used to direct the gas from within the bubbles from the bulk of the bubble-containing liquid to the gaseous environment outside of the bubble-containing liquid. In some embodiments, the conduit is at least partially submerged in a configuration such that an internal gas pathway of the conduit is established from the submerged portion of the conduit to the gaseous environment outside of the foam and/or bubble-containing liquid. This can be achieved, for example, by submerging the conduit such that at least one submerged pore of the porous wall portion of the conduit establishes a gaseous pathway from an external surface of the conduit to an internal gas passageway of the conduit. For example, as shown in FIG. 1A, conduit 104 is at least partially submerged into bubble-containing liquid 102 such that gas is trapped between the pores of porous wall portion 136. The gas trapped within the pores of porous wall portion 136 can establish gaseous pathway 112 from external surface 130 of conduit 104 to internal gas passageway 126 and further to gaseous environment 122 outside of the liquid. The pores and gas trapped within the pores of the porous wall portion can be seen more clearly, for example, in FIG. 1C. FIG. 1C is a cross-sectional schematic diagram illustrating the interaction of a bubble with a conduit, according to certain embodiments. As shown in FIG. 1C, porous wall portion 136 comprises pores 106 and gas 108 positioned within pores 106. In certain embodiments, gaseous pathway 112 is established within pores 106. Gaseous pathway 112 is arranged, according to certain embodiments, such that one end of the pathway is submerged within bubble-containing liquid 102, and the other end of the pathway is contained within conduit 104.

The foam and/or bubble-containing liquid generally includes a liquid phase and bubbles contained within the liquid phase. For example, as shown in FIG. 1A, bubble-containing liquid 102 includes liquid phase 120 and submerged bubbles 114 contained within bubble-containing liquid 102 and liquid phase 120. As used herein, the term "bubble" is given its ordinary meaning in the art, and refers to a gaseous phase surrounded by a liquid. According to certain embodiments, a bubble can have any suitable shape, such as spherical, deviational from spherical, or ellipsoidal. As used herein, an "emulsion" (i.e., a first liquid phase surrounded by a second liquid phase, such as in an oil-in-water emulsion) is not a "bubble."

In some embodiments, the bubbles are completely submerged in the bulk (e.g., liquid phase) of the bubble-containing liquid (e.g., a "submerged bubble"). For example, as shown in FIG. 1A, submerged bubbles 114 are in the bulk of bubble-containing liquid 102. According to some other embodiments, the bubbles are at the interface of the bubble-containing liquid and another fluid (e.g., a gaseous environment outside the bubble-containing liquid, another liquid, etc.), with a thin layer of liquid at least partially surrounding the gas of the bubble (e.g., a "interface bubble"). For example, as shown in FIG. 1A, submerged bubbles 114 travel through the bulk of bubble-containing liquid 102 and reach the interface of bubble-containing liquid 102 and gaseous environment 122 outside bubble-containing liquid 102, generating layer bubble 116 at the interface of bubble-containing liquid 102 and gaseous environment 122. In some cases, an interface bubble can migrate away from the liquid such that the interface bubble is completely surrounded by a thin layer of liquid.

The bubbles, if allowed to accumulate, can form a foam. The term "foam," as used herein, is given its ordinary meaning in the art, and refers to an accumulation of a plurality of pockets of entrapped gas. An example of foam is shown, for example, in FIG. 6, and is described in more detail below.

As noted above, according to certain embodiments, the conduit comprises a porous wall portion comprising at least one submerged pore establishing a gaseous pathway from an external surface of the conduit, through the porous wall portion of the conduit, and to an internal gas passageway of the conduit. The at least one submerged pore is, according to certain embodiments, a milliscale, microscale, and/or nanoscale submerged pore. Examples of suitable pores that can be used to transport gas within bubbles are shown in FIG. 1C.

According to certain embodiments, the at least one submerged pore is submerged into the foam and/or bubble-containing liquid as the conduit is at least partially submerged into the bubble-containing liquid. For example, as shown in FIG. 1A, as conduit 104 is partially submerged into bubble-containing liquid 102, the pores of porous wall portion 136 are also submerged into bubble-containing liquid 102 (and, thus, constitute submerged pores).

In certain embodiments, gas is positioned within the submerged pores. For example, referring to FIG. 1C, gas 108 is positioned within pores 106 that are submerged into bubble-containing liquid 102. Those of ordinary skill in the art, given the disclosure provided herein, would be capable of configuring and/or selecting pores having suitable properties to ensure that gas remains positioned within the pores when the conduit is submerged in the liquid. For example, a person of ordinary skill in the art would be capable of selecting appropriate pore properties (e.g., size, shape, tortuosity, etc.) and/or materials of construction of the porous wall portion, which could involve taking into account certain wetting properties of the liquid of the bubble-containing liquid and/or the foam into which the conduit is to be submerged.

According to certain embodiments, the at least one submerged pore is configured to restrict the transport of a liquid of the foam and/or the bubble-containing liquid through the wall portion. For example, referring to FIG. 1C, submerged pores 106 are configured to restrict the transport of liquid phase 120 of bubble-containing liquid 102 through porous wall portion 136. Those of ordinary skill in the art, given the disclosure provided herein, would be capable of configuring and/or selecting pores such that the transport of the liquid of the foam and/or the bubble-containing liquid through the wall portion is restricted. For example, the pores may have properties (e.g., size, shape, tortuosity, etc.) that result in transport of the liquid through the pore being energetically disfavored (while, at the same time, transport of gas through the pore is energetically favored). In addition, in some cases, the material from which the wall of the porous wall portion is made can be selected such that transport of the liquid through the pore is energetically disfavored (e.g., by using materials that are not wetting with respect to the liquid) while, at the same time, transport of gas through the pore is energetically favored.

According to certain embodiments, little or no liquid is transported from the foam and/or the bubble-containing liquid, through the porous wall portion, and into the conduit. This can be achieved, for example, by selecting properties of the porous wall portion that reduce or eliminate the amount of liquid that is transported through the porous wall portion. At the same time, according to certain embodiments, the porous wall portion may be freely capable of having gas transported through its pores, for example, as described elsewhere herein. In some embodiments, during operation, the ratio of the volume of gas transported through the porous wall portion and into the conduit (from the foam and/or bubble-containing liquid) to the volume of liquid transported through the porous wall portion and into the conduit (from the foam and/or bubble-containing liquid) is at least 100:1; at least 1000:1; at least 10,000:1, at least 100,000:1, at least 1,000,000:1, or more.

As noted above, according to certain embodiments, the gas within the pores forms a gaseous pathway from within the liquid to an interior of the conduit. For example, in some cases, gas positioned within the pores prior to submersion of the conduit remains trapped within the pores after submersion. This can result in the formation of a continuous gaseous pathway from an external surface of the conduit, through the pores, and into an interior of the conduit. In some cases, this results in the formation of a continuous gaseous pathway from an external surface of the conduit, through the pores, and into an interior portion of the conduit that is also submerged within the foam and/or the bubble-containing liquid. As described in more detail below, in some embodiments, the gas that is transported out of the bubbles and into the interior of the conduit can be transported to a non-submerged portion of the conduit and/or to a gaseous environment outside the conduit (and/or outside the foam and/or the bubble-containing liquid) via a gaseous pathway within the interior of the conduit.

According to certain embodiments, the external surface of the conduit comprises a plurality of features. For example, in certain embodiments, the external surface of the conduit comprises milliscale, microscale, and/or nanoscale features.

Figure 2A:
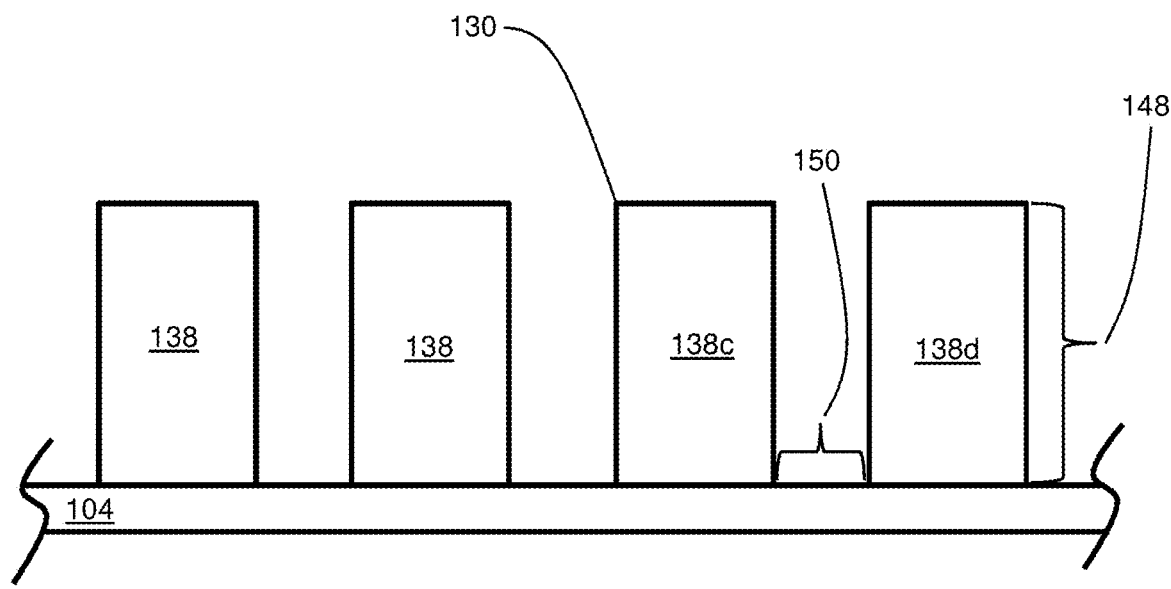
FIG. 2A is a cross-sectional schematic diagram of an external surface of a conduit, according to some embodiments.
Figure 2B:
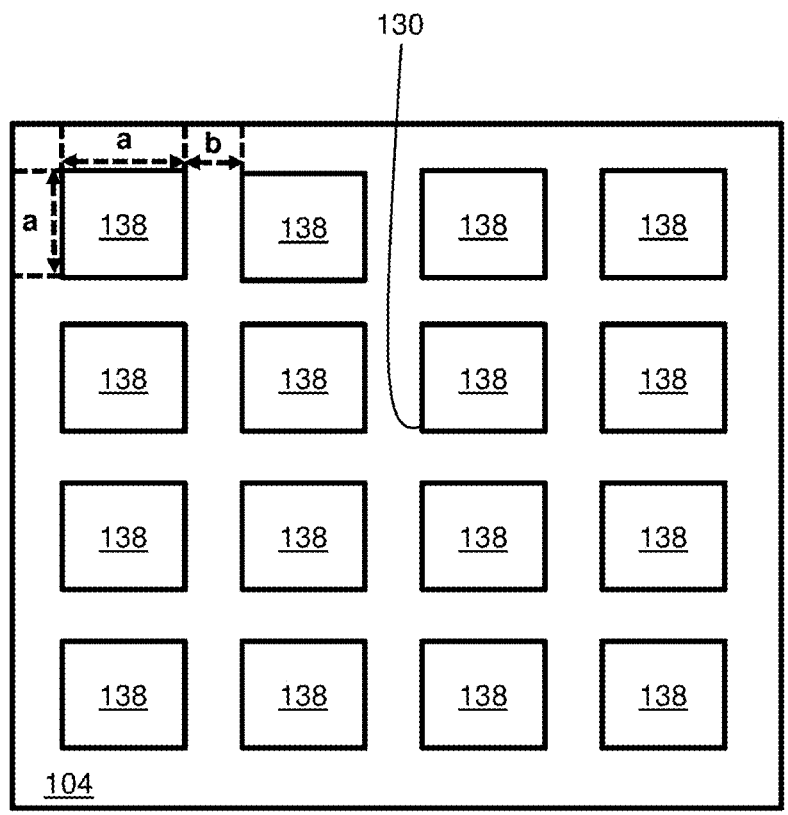
FIG. 2B is a top view schematic diagram of an external surface of a conduit shown in FIG. 2A.

In some embodiments, the features comprise protrusions. Non-limiting examples of protrusions include spherical or hemispherical protrusions. According to certain embodiments, the features comprise ridges, spikes, posts and/or pores. In certain embodiments, the milliscale, microscale, and/or nanoscale pores of the external surface of the conduit are the milliscale, microscale, and/or nanoscale pores described herein relating to the porous wall portion of the conduit. In certain embodiments, the features may be dispersed on the external surface in a random (e.g., fractal) or patterned manner. According to some embodiments, the features of the external surface are at least partially submerged into the bubble-containing liquid as the conduit is at least partially submerged into the bubble-containing liquid. FIG. 2A is a cross-sectional schematic diagram of an external surface of a conduit, according to some embodiments, and FIG. 2B is a top view schematic diagram of an external surface of a conduit shown in FIG. 2A. As shown in FIGS. 2A and 2B, conduit 104 comprises external surface 130 that comprises plurality of milliscale, microscale, and/or nanoscale features 138. In certain embodiments, and as shown in FIGS. 2A and 2B, the plurality of milliscale, microscale, and/or nanoscale features 138 are posts.

In certain embodiments, the system comprises a source of bubbles within and/or in fluidic communication with the foam and/or bubble-containing liquid. The source of bubbles within and/or in fluidic communication with the foam and/or bubble-containing liquid, in accordance with some embodiments, can be any of a variety of suitable sources of bubbles (e.g., a bubble-producing conduit, a chemical reaction), as described in more detail elsewhere herein. According to certain embodiments, submerged bubbles are transported from the source of bubbles, through the bubble-containing liquid, to the external surface when the conduit is at least partially submerged in the bubble-containing liquid. For example, as shown in FIG. 1A, source of bubbles 118 (e.g., a bubble-producing conduit) within liquid phase 120 provides submerged bubbles 114 that are transported from the source of bubbles 118, through bubble-containing liquid 102.

According to certain embodiments, bubbles within the bubble-containing liquid are transported proximate the conduit. For example, referring to FIG. 1A, submerged bubble 114b can be transported from the source of bubbles 118 and through bubble-containing liquid 102 until the one or more bubbles is proximate conduit 104 and external surface 130 of conduit 104 when conduit 104 is at least partially submerged in bubble-containing liquid 102.

As noted herein, according to some embodiments, the conduit comprises an external surface that comprises a plurality of milliscale, microscale, and/or nanoscale features. According to certain embodiments, the milliscale, microscale, and/or nanoscale features cause bubbles to attach to the external surface of the conduit. For example, as shown in FIG. 1A, conduit 104 (which is at least partially submerged into bubble-containing liquid 102) comprises external surface 130 comprising milliscale, microscale, and/or nanoscale features, according to certain embodiments. In certain embodiments, the milliscale, microscale, and/or nanoscale features of external surface 130 of conduit 104 cause bubble 110 to attach to external surface 130 of conduit 104. The features can be tailored to produce adhesion between the bubbles and the conduit, in accordance with certain embodiments, by selecting sizes, shapes, and/or materials of construction of the features that promote adhesion between the bubbles and the conduit. For example, according to certain embodiments, the milliscale, microscale, and/or nanoscale features are tailored such that the external surface is non-wetting with respect to the bubble-containing liquid and/or foam and prefers to be in contact with the gas from within the bubble rather than the liquid of the bubble-containing liquid, which is described further herein. In certain embodiments, the materials of construction of the external surface of the conduit do not dissolve in the bubble-containing liquid, react with the bubble-containing liquid, and/or react with the gas from within the bubbles of the bubble-containing liquid. In some embodiments, the external surface of the conduit retains its structural shape under hydrostatic pressure.

In some embodiments, the external surface of the conduit breaks a liquid/gas interface of a bubble once the bubble has attached to the external surface of the conduit. For example, referring to FIG. 1C, external surface 130 breaks liquid/gas interface 134 of submerged bubble 114 as submerged bubble 114 becomes bubble 110 attached to external surface 130 due to the milliscale, microscale, and/or nanoscale features of external surface 130, according to some embodiments. Without wishing to be bound by any particular theory, it is believed that the liquid/gas interface of the bubbles may be breached due to the non-wetting nature of external surface 130 with respect to the liquid in which the bubbles are formed.

According to certain embodiments, once the liquid/gas interface of the bubble is broken, the gas from within the bubbles merges with the gas positioned within the submerged pores. For example, referring to FIG. 3, gas 140 within bubble 110 attached to external surface 130 of conduit 104 merges with gas 108b positioned within pores 106 of porous wall portion 136.

In some embodiments, merging of a previously submerged bubble with the gas positioned within the submerged pores can result in removal of the previously submerged bubble from the bubble-containing liquid. For example, referring to FIG. 3, gas 140 within bubble 110 completely merges with gas 108b positioned within pores 106 of porous wall portion 136 such that there is no longer a bubble that is distinguishable from the other pockets of gas 108 positioned within pores 106.

Figure 3:
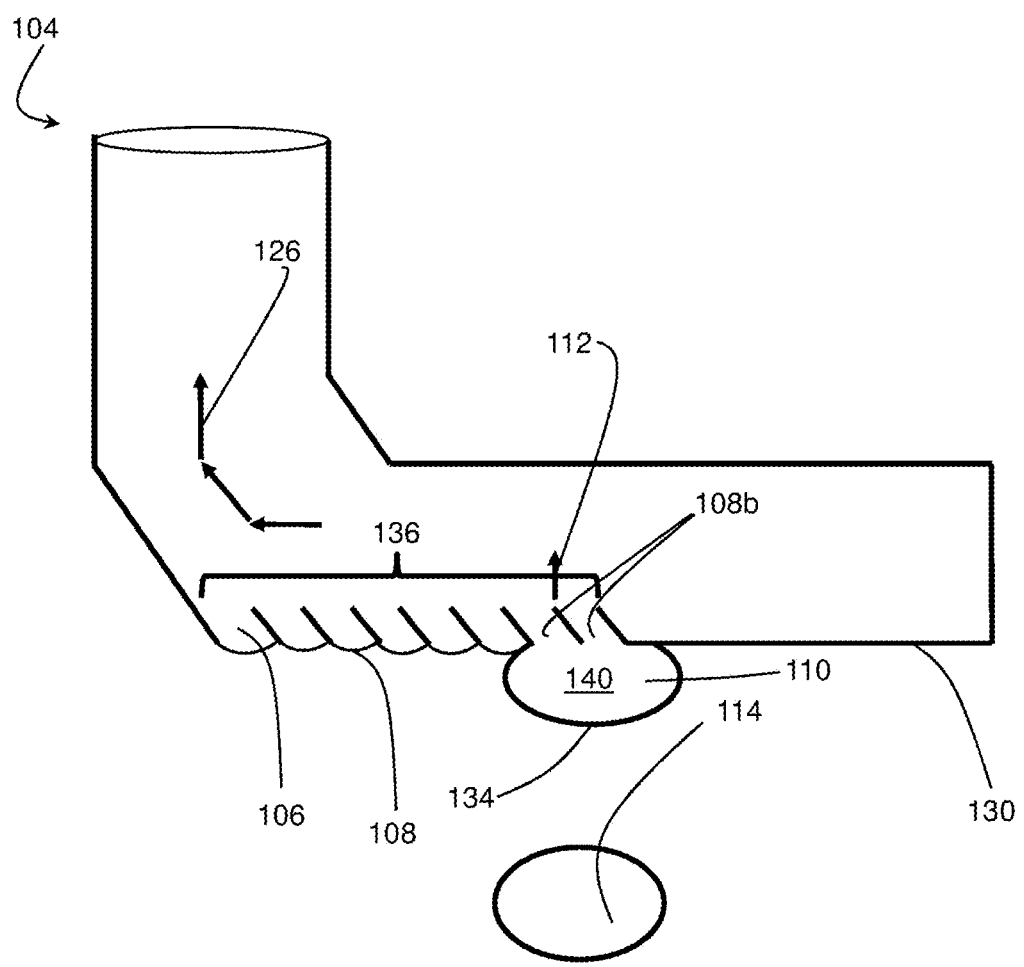
FIG. 3 is a cross-sectional schematic diagram illustrating the interaction of bubbles with gas positioned within pores on a conduit wall portion, according to some embodiments.

According to certain embodiments, gas from within bubbles (e.g., previously submerged bubbles) is transported through the submerged pores. For example, as shown in FIG. 3, gas 140 within bubble 110 can be transported through submerged pores 106 and merge with gas 108b positioned within pores 106 of porous wall portion 136.

In certain embodiments, gas from within bubbles of the foam and/or the bubble-containing liquid (e.g., previously submerged bubbles) is transported from the bubbles, through the gaseous pathway, and into an interior of the conduit. For example, as shown in FIG. 3, gas 140 within bubble 110 is transported from bubble 110, through gaseous pathway 112, and into internal gas passageway 126 of conduit 104.

According to certain embodiments, the gas from within the bubbles further merges with the internal gas passageway of the conduit. For example, as noted above, when a bubble impacts the external surface of the conduit, the bubble can rupture and release the gas it contains to the gaseous pathway (e.g., via the gas trapped within submerged pores of the porous wall portion of the conduit). In some embodiments, as the gas is released to the gaseous pathway, the gas travels along the gaseous pathway until it merges with the internal gas passageway of the conduit. Referring to FIG. 3, gas 140 within bubble 110 that has merged with gas 108 positioned within pores 106 of porous wall portion 136 of conduit 104 and has been transported through gaseous pathway 112 into the interior of conduit 104 can further merge with internal gas passageway 126 of conduit 104.

In some embodiments, the gas from within the bubbles is further transported along the internal gas passageway of the conduit until the gas from within the bubbles enters a gaseous environment separate from the foam and/or bubble-containing liquid. For example, as shown in FIG. 1A, gas from within bubble 110 that has merged with internal gas passageway 126 of conduit 104 is further transported until gas from within bubble 110 entered gaseous environment 122 separate from the foam and/or bubble-containing liquid. In some embodiments, the transport of the gas to the environment separate from the foam and/or the bubble-containing liquid occurs because the movement of the gas previously contained within the submerged bubble is no longer restricted by the wall of the bubble once the wall has been ruptured.

According to certain embodiments, gas from within multiple bubbles is transported through the gaseous pathway and into the internal gas passageway of the conduit, such that accumulation of the bubbles into a foam layer is reduced or prevented. According to certain embodiments, if bubbles from the bubble-containing liquid are caught by the external surface, then a foam layer in the bubble-containing liquid can be reduced and/or prevented. According to certain embodiments, as the gas from within multiple bubbles (e.g., submerged bubbles) continuously travels along the gaseous pathway and to the internal gas passageway of the conduit and further to the gaseous environment outside of the bubble-containing liquid, bubbles at the interface (e.g., layer bubbles) and/or a layer of bubbles (e.g., foam) will be reduced and/or prevented.

According to certain embodiments, upon use of the systems and/or methods described herein for transporting gas out of bubbles, the volume of the foam is reduced and/or the formation of the foam is prevented. According to certain embodiments, if bubbles from the bubble-containing liquid are caught by the external surface, then a foam layer in the bubble-containing liquid can be reduced and/or prevented. According to certain embodiments, as the gas from within multiple bubbles (e.g., submerged bubbles) continuously travels along the internal gas passageway to the gaseous environment outside of the bubble-containing liquid, bubbles at the interface (e.g., layer bubbles) and/or a layer of bubbles (e.g., foam) will be reduced and/or prevented.

Certain embodiments relate to systems and methods for transporting gas out of bubbles and reducing the volume of a foam that has already been formed. The systems and methods for reducing the volume of a foam can be performed in addition to or in place of methods for transporting gas out of bubbles.

In certain embodiments, submerged bubbles are transported from a source of the submerged bubbles, through the bubble-containing liquid, and to an interface of the bubble-containing liquid and a gaseous environment outside the liquid while the conduit is not submerged in the bubble-containing liquid. This can generate, according to some embodiments, a layer of foam at the interface of the bubble-containing liquid and the gaseous environment outside of the liquid. In certain embodiments, the conduit is at least partially submerged into this foam.

Figure 6:
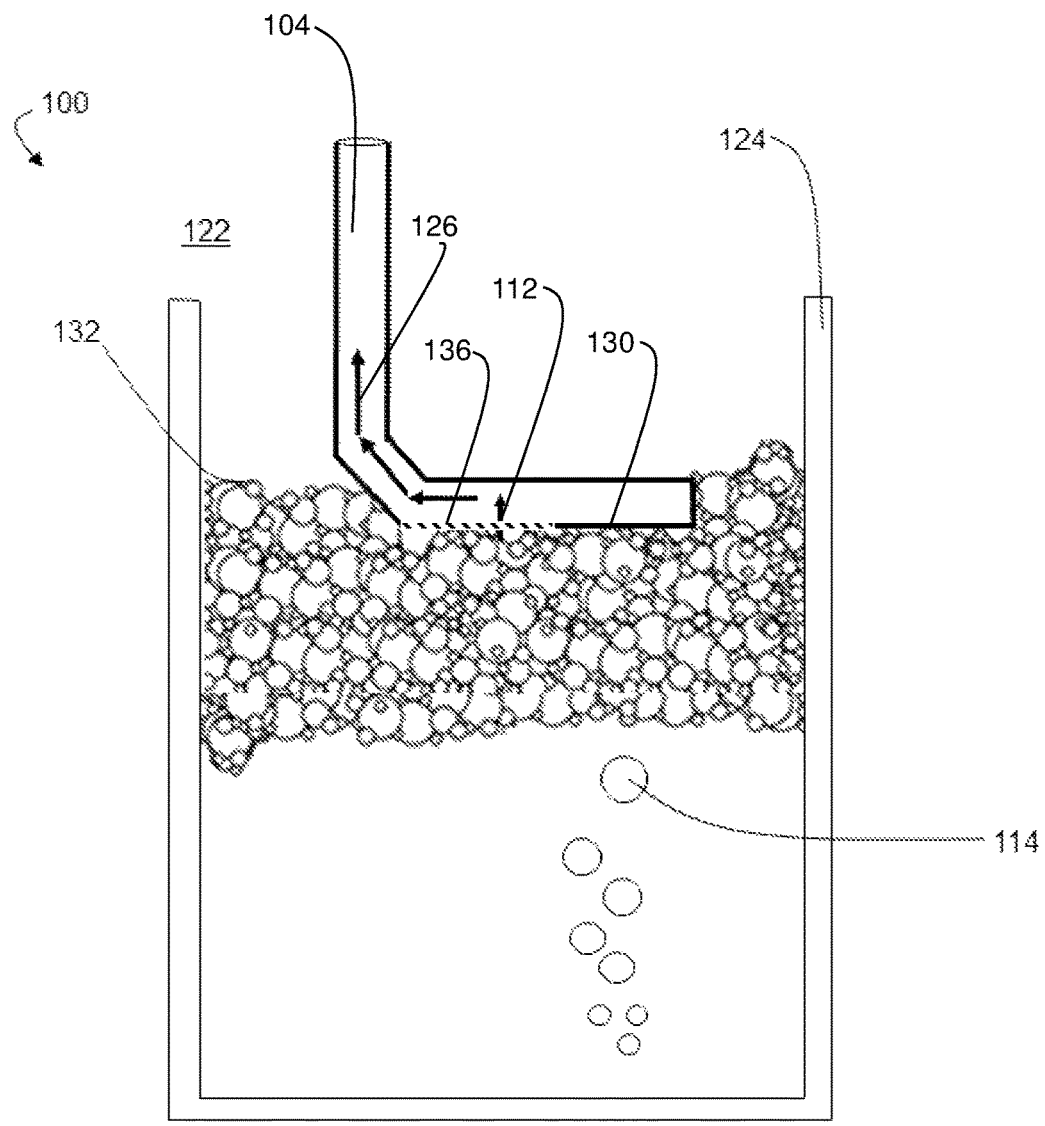
FIG. 6 is a cross-sectional schematic diagram of a system in which a conduit partially submerged into foam is used to reduce foaming, according to some embodiments.

FIG. 6 is a cross-sectional schematic diagram of a system in which a conduit partially submerged into foam is used to reduce the volume of the foam, in accordance with certain embodiments. As shown in FIG. 6, conduit 104 is partially submerged into foam 132.

According to certain embodiments, gas from within the bubbles is transported out of bubbles using the methods described herein and the volume of the foam is reduced. In some such embodiments, the bubbles of the foam interact with the external surface of the conduit such that the liquid/gas interface of a bubble is breached (e.g., in a manner similar to that described above with respect to submerged bubbles). In some embodiments, after the liquid/gas interface of a bubble is breached, gas from within bubbles (e.g., previously submerged bubbles) is transported through the milliscale, microscale, and/or nanoscale submerged pores and through the gaseous pathway into an interior of the conduit (e.g., internal gas passageway) until the gas from within the bubbles of the foam enters a gaseous environment separate from the foam. According to some embodiments, for example, as shown in FIG. 1C, merged gas from within bubble 110 (which can originate from foam) is transported through the pores of porous wall portion 136, along gaseous pathway 112, to internal gas passageway 126 until the merged gas enters gaseous environment 122. Gaseous environment 122 can be separate from the foam from which the bubble originated (e.g., foam 132 in FIG. 6).

In some embodiments, certain of the conduits described herein can be designed to have certain wetting properties that can be useful, for example, in transporting gas out of bubbles. According to certain embodiments, the external surface of the conduit is non-wetting with respect to the liquid of the foam and/or the bubble-containing liquid. For example, in FIG. 1A, external surface 130 of conduit 104 is non-wetting with respect to liquid phase 120 of bubble-containing liquid 102, according to certain embodiments. In some embodiments, the conduit is non-wetting with respect to the liquid that defines the wall of a foam. For example, in FIG. 6, external surface 130 can be non-wetting with respect to the liquid from which the walls of the bubbles in foam 132 are made.

Figure 4A:
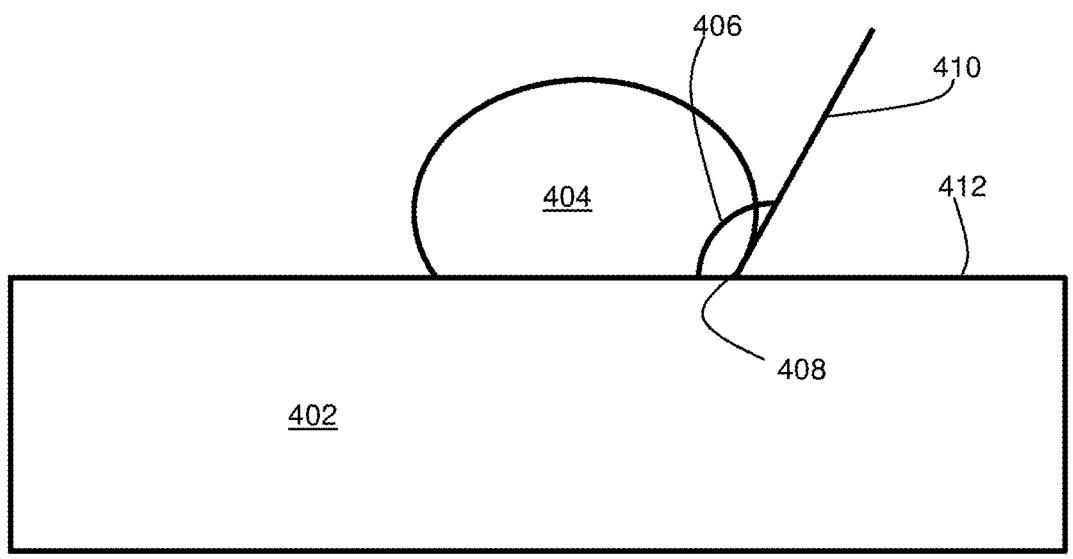
FIG. 4A is an exemplary cross-sectional schematic diagram illustrating the interaction of a liquid droplet with a surface when the surface is non-wetting with respect to the liquid.
Figure 4B:
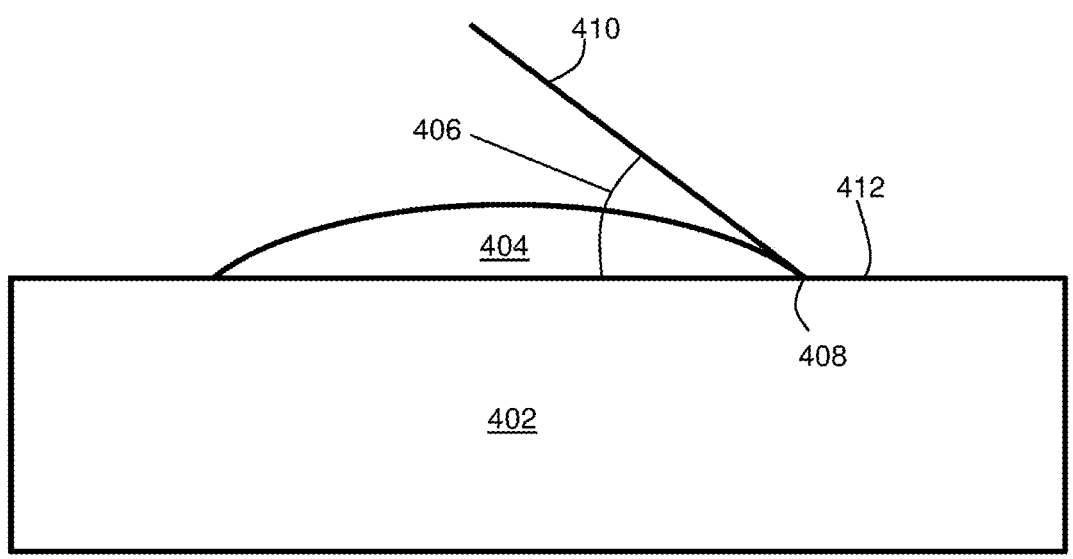
FIG. 4B is an exemplary cross-sectional schematic diagram illustrating the interaction of a liquid droplet with a surface when the surface is wetting with respect to the liquid.

As used herein, a surface is considered to be non-wetting with respect to a liquid when, if a droplet of the liquid is positioned on the surface in a gaseous environment at the temperature and pressure at which the liquid and surface are being used, the droplet forms a contact angle, as measured through the bulk of the droplet, of greater than 90°. FIG. 4A shows an exemplary cross-sectional schematic diagram illustrating the interaction of liquid droplet 404 with surface 412 of substrate 402 when the surface is non-wetting with respect to the liquid. As shown in FIG. 4A, contact angle 406 is measured between (1) line 410 drawn tangent to the exterior surface of droplet 404 at point of contact 408 with substrate surface 412 and (2) substrate surface 412. Contact angle 406 is measured through the bulk of droplet 404. In FIG. 4A, contact angle 406 is greater than 90° (e.g., about 120°). This indicates that substrate surface 412 is non-wetting with respect to droplet 404 of the liquid. Conversely, FIG. 4B shows an exemplary cross-sectional schematic diagram illustrating the interaction of a liquid droplet with a surface when the surface is wetting with respect to the liquid. Contact angle 406 between droplet 404 of the liquid on substrate surface 412 is less than 90° (e.g., about 50° in FIG. 4B), indicating that substrate surface 412 is non-wetting with respect to droplet 404 of the liquid.

According to certain embodiments, the external surface is non-wetting with respect to the liquid at a temperature of 25° C. and at a pressure of 1 atmosphere.

Non-limiting examples of non-wetting surfaces include surfaces with properties understood by those skilled in the art. According to certain embodiments, for example, surfaces that are superhydrophobic, superoleophobic, supermetallophobic, superomniphobic, hydrophobic, oleophobic, metallophobic, and/or omniphobic can be used.

According to certain embodiments, the contact angle between the external surface and the liquid may be relatively large when the external surface is non-wetting with respect to the liquid. For example, according to certain embodiments, the contact angle between the external surface and the liquid, when the surface is non-wetting with respect to the liquid, is greater than 100°, greater than 105°, greater than 110°, greater than 120°, greater than 130°, greater than 140°, greater than 150°, greater than 160°, or greater than 170°. In some embodiments, the contact angle between the liquid and the external surface, when the external surface is non-wetting with respect to the liquid, is less than 179°, less than 170°, less than 160°, less than 150°, less than 140°, less than 130°, less than 120°, less than 110°, or less than 100°. Combinations of these values are also possible (e.g., greater than 100° and less than 130°, or greater than 150° and less than) 179°. The contact angle between the external surface and the liquid can fall within any of these ranges, for example, when the droplet of the liquid and the external surface are present at conditions at which the method is performed (e.g., during use). In some embodiments, the external surface is configured such that a droplet of the liquid of the bubble-containing liquid forms a contact angle of greater than 100° when the droplet of the liquid of the bubble-containing liquid is present on the external surface, or when the droplet of the liquid and the external surface are present at conditions at which the method is performed. According to certain embodiments, the external surface is configured such that a droplet of the liquid of the bubble-containing liquid forms a contact angle of greater than 120° when the droplet of the liquid of the bubble-containing liquid is present on the external surface, or when the droplet of the liquid and the external surface are present at conditions at which the method is performed.

According to certain embodiments, the external surface is configured such that the external surface and the liquid of the foam and/or bubble-containing liquid satisfy the following relationship:

$$\frac{(1-\varphi)}{(r-\varphi)} < -\cos\theta$$

wherein $\varphi$ is the solid fraction of the external surface, r is the roughness of the external surface, and $\theta$ is the contact angle that would be made between a hypothetical surface without the milliscale, microscale, and/or nanoscale features and a droplet of the liquid of the foam and/or the bubble-containing liquid.

According to certain embodiments, the features (e.g., the milliscale, microscale, and/or nanoscale features) of the external surface of the conduit are distributed over a substrate such that the features occupy a particular solid fraction. The term "solid fraction" (also referred to as $\varphi$), as used herein, refers to the area fraction of a substrate that would be in direct contact with the liquid when submerged in the liquid. The solid fraction can be calculated by dividing the areas of the tops of the features that would be in contact with the liquid by the geometric surface area over which those features are distributed. For example, referring to FIG. 1A and FIG. 2B, when conduit 104 is submerged into the liquid (as shown, for example, in FIG. 1A), the tops of milliscale, microscale, and/or nanoscale features 138 are in contact with the liquid, while the rest of the surface over which the features are distributed is not. In the set of embodiments illustrated by FIG. 2B, each of milliscale, microscale, and/or nanoscale features 138 have identical side lengths a and identical nearest neighbor spacings b. Accordingly, the surface solid fraction ($\varphi$) occupied by the features in FIG. 2B would be calculated as follows:

$$\varphi = a^2/(a+b)^2$$

The external surface can have any of a variety of suitable surface roughnesses, for example, established by the milliscale, microscale, and/or nanoscale features. The surface roughness is calculated as the total surface area of the sample (including features, holes, etc.) divided by the geometric surface area. Thus, for the case of the posts shown in FIGS. 2A-2B, the roughness would be:

$$r = 1 + 4ah/(a+b)^2$$

where h is the height of the post (corresponding to maximum height 148 in FIG. 2A). In some embodiments, the external surface has a surface roughness of greater than 1.

The features, in accordance with certain embodiments, may be introduced to the external surface using a variety of suitable methods, including mechanical and/or chemical methods. For example, in some embodiments, the features can be introduced to the external surface via lithography. In certain embodiments, the features can be introduced to the external surface via self-assembly. In some embodiments, the features can be deposited onto a substrate. According to certain embodiments, the features can be etched into the substrate (e.g., using acid etching, base etching, and/or plasma etching). In some embodiments, the features can be sintered onto the substrate (e.g., via powder sintering). Certain embodiments comprise forming the features by inducing phase change and/or crystallization. For example, in some embodiments, features are formed when a material is melted and/or dissolved and when the material solidifies again (e.g., during cooling and/or precipitation, for example, after solvent has evaporated) it forms solid features (e.g., in the form of crystals). These solid features can serve as the features described elsewhere herein (e.g., the milliscale, microscale, and/or nanoscale features).

According to certain embodiments, the surface can be at least partially made up of milliscale features. "Milliscale" is used herein in a manner consistent with its ordinary meaning in the art. Milliscale features are features having a maximum height of greater than 100 micrometers and up to 10 millimeters. Maximum height generally refers to the longest dimension from the substrate on which the feature is positioned to the end of the feature opposite the substrate. As one illustrative example, referring to FIG. 2A, feature 138d has maximum height 148. The maximum height of microscale features may be measured by electron microscopy techniques (e.g., scanning electron microscopy and/or transmission electron microscopy). The electron microscopy techniques can be supplemented by, for example, profilometry (e.g., optical or contact profilometers).

According to some embodiments, the maximum height of the milliscale features is greater than 100 micrometers and up to 1 millimeter, greater than 100 micrometers and up to 200 micrometers, from 200 micrometers to 300 micrometers, from 300 micrometers to 500 micrometers, from 500 micrometers to 700 micrometers, from 700 micrometers to 1 millimeter, from 1 millimeter to 3 millimeters, from 3 millimeters to 5 millimeters, and/or from 5 millimeters to 10 millimeters. Combinations of the above cited ranges are also possible (e.g., from 300 micrometers to 700 micrometers, or from 200 micrometers to 1 millimeter).

In accordance with some embodiments, the external surface can comprise microscale features. "Microscale" is used herein in a manner consistent with its ordinary meaning in the art. Microscale features are features having a maximum height of from 1 micrometer to 100 micrometers. The maximum height of microscale features may be measured by electron microscopy techniques (e.g., scanning electron microscopy and/or transmission electron microscopy). The electron microscopy techniques can be supplemented by, for example, profilometry (e.g., optical or contact profilometers).

According to some embodiments, the maximum height of the microscale features is from 1 micrometer to 10 micrometers, 10 micrometers to 20 micrometers, 20 micrometers to 30 micrometers, 30 micrometers to 50 micrometers, 50 micrometers to 70 micrometers, or 70 micrometers to 100 micrometers. Combinations of the above cited ranges are also possible (e.g., 30 micrometers to 70 micrometers, or 20 micrometers to 100 micrometers).

In certain embodiments, the external surface can comprise nanoscale features. "Nanoscale" is used herein in a manner consistent with its ordinary meaning in the art. Nanoscale features are features from 1 nm to 1 micrometer in maximum height. According to some embodiments, the maximum height of the nanoscale features is from 1 nm to 100 nm, 100 nm to 200 nm, 200 nm to 300 nm, 300 nm to 500 nm, 500 nm to 700 nm, or 700 nm to 1 micrometer. Combinations of the above cited ranges are also possible (e.g., 300 nm to 700 nm, or 200 nm to 1 micrometer).

According to certain embodiments, the milliscale, microscale, and/or nanoscale features may have any of a variety of suitable feature characteristic spacings. As used herein, the characteristic spacing of a particular feature refers to the shortest distance between the surface of the feature and the surface of that feature's nearest neighbor. For example, referring to FIG. 2A, the feature characteristic spacing 150 of feature 138d is the shortest distance between the surface of feature 138d and the surface of feature 138c. For a plurality of features, the average feature characteristic spacing refers to the number average of the feature characteristic spacings of the individual features.

According to some embodiments, the average characteristic spacing between the milliscale features, when present, is at least 100 micrometers, at least 500 micrometers, at least 1 millimeter, at least 3 millimeters, at least 5 millimeters, or at least 9 millimeters. According to certain embodiments, the average characteristic spacing between the milliscale features, when present, is less than or equal to 10 millimeters, less than or equal to 5 millimeters, less than or equal to 3 millimeters, less than or equal to 1 millimeter, least than or equal to 500 micrometers, or less than or equal to 200 micrometers. Combinations of these ranges are also possible (e.g., from 200 micrometers to 3 millimeters, from 500 micrometers to 5 millimeters, from 1 millimeter to 10 millimeters).

According to some embodiments, the average feature characteristic spacing between the microscale features, when present, is at least 1 micrometer, at least 5 micrometers, at least 10 micrometers, at least 30 micrometers, at least 50 micrometers, or at least 90 micrometers. According to some embodiments, the average feature characteristic spacing between the microscale features is less than or equal to 500 micrometers, less than or equal to 200 micrometers, less than or equal to 100 micrometers, less than or equal to 90 micrometers, less than or equal to 70 micrometers, less than or equal to 50 micrometers, less than or equal to 30 micrometers, less than or equal to 10 micrometers, or less than or equal to 5 micrometers. Combinations of these ranges are also possible (e.g., from 1 micrometer to 5 micrometers, from 5 micrometers to 10 micrometers, from 10 micrometers to 30 micrometers, from 30 micrometers to 50 micrometers, from 50 micrometers to 70 micrometers, from 70 micrometers to 90 micrometers, or from 90 micrometers to 100 micrometers).

According to some embodiments, the average feature characteristic spacing between the nanoscale features, when present, is at least 1 nm, at least 10 nm, at least 50 nm, at least 100 nm, at least 200 nm, at least 300 nm, at least 500 nm, or at least 700 nm. According to some embodiments, the average feature characteristic spacing between the nanoscale features, when present, is less than or equal to 1 micrometer, less than or equal to 700 nm, less than or equal to 500 nm, less than or equal to 300 nm, less than or equal to 200 nm, less than or equal to 100 nm, less than or equal to 50 nm, or less than or equal to 10 nm. Combinations of these ranges are also possible (e.g., from 1 nm to 100 nm, from 100 nm to 200 nm, from 200 nm to 300 nm, from 300 nm to 500 nm, from 500 nm to 700 nm, or from 700 nm to 1 micrometer).

According to certain embodiments, the features may be relatively regularly spaced across the external surface. This may be achieved, for example, by spacing the features in a pattern. In some embodiments, the standard deviation of the nearest neighbor distances of the features on the external surface is less than 20% (or less than 10%, or less than 5%, or less than 2%, or less than 1%) of the number average of the nearest neighbor distances of the features on the external surface. This standard deviation can be determined by determining, for each feature, the nearest neighbor distance and comparing the standard deviation of those nearest neighbor distances to the number average of those nearest neighbor distances.

According to some embodiments, the features on the external surface can include a combination of features of different characteristic lengths. Without wishing to be bound by any particular theory, it is believed that the use of surfaces having such combinations of features can, according to certain embodiments, reduce the amount of time required to remove gas from within bubbles that impinge on the surface. According to certain embodiments, the surface comprises both milliscale features and microscale features. In some embodiments, the surface comprises both microscale features and nanoscale features. In certain embodiments, the surface comprises both milliscale features and nanoscale features. According to some embodiments, the surface comprises milliscale features, microscale features, and nanoscale features.

As noted above, in some embodiments, the porous wall portion of the conduit can be at least partially made up of milliscale pores, microscale pores, and/or nanoscale pores. In certain embodiments, the pores may be dispersed on the porous wall portion in a random (e.g., fractal) or patterned manner.

The pores, in accordance with certain embodiments, may be introduced to the porous wall portion using a variety of suitable methods, including mechanical and/or chemical. For example, in some embodiments, the pores can be introduced to the surface via lithography. In certain embodiments, the pores can be introduced to the surface via self-assembly. According to certain embodiments, the pores can be etched into a substrate (e.g., using acid etching, base etching, and/or plasma etching). In some embodiments, the pores can be sintered onto a substrate (e.g., via powder sintering). In some embodiments, the pores can be part of a membrane that has been integrated into the conduit. In certain embodiments, the pores can be introduced to the surface via laser ablation.

As noted above, according to certain embodiments, gas is positioned within the pores when the conduit is at least partially submerged into the foam and/or the bubble-containing liquid. According to certain embodiments, the pores are sized to stably contain gas therebetween or therewithin once the conduit has been at least partially submerged into the bubble-containing liquid. For example, in FIG. 3, conduit 104 comprises a plurality of pores 106. Pores 106 form, in accordance with certain embodiments, a matrix of solid pores on external surface 130, and the pores are sized such that they stably contain gas 108 therebetween. According to some embodiments, as shown in FIG. 3 and as described herein, submerged bubbles 114 approach external surface 130 of conduit 104. Upon reaching external surface 130, gas 140 from within the bubble 110 merges with gas 108b positioned within the milliscale, microscale and/or nanoscale pores 106, in accordance with certain embodiments. Gas 140 from within bubble 110 can then be transferred through pores 106 and along internal gas passageway 126, as described herein.

In some embodiments, the size and/or shape of the pores is selected such that the pores are able to trap gas when submerged into a foam and/or a bubble containing liquid. The sizes and shapes of the pores are described in more detail herein.

Figure 2C:
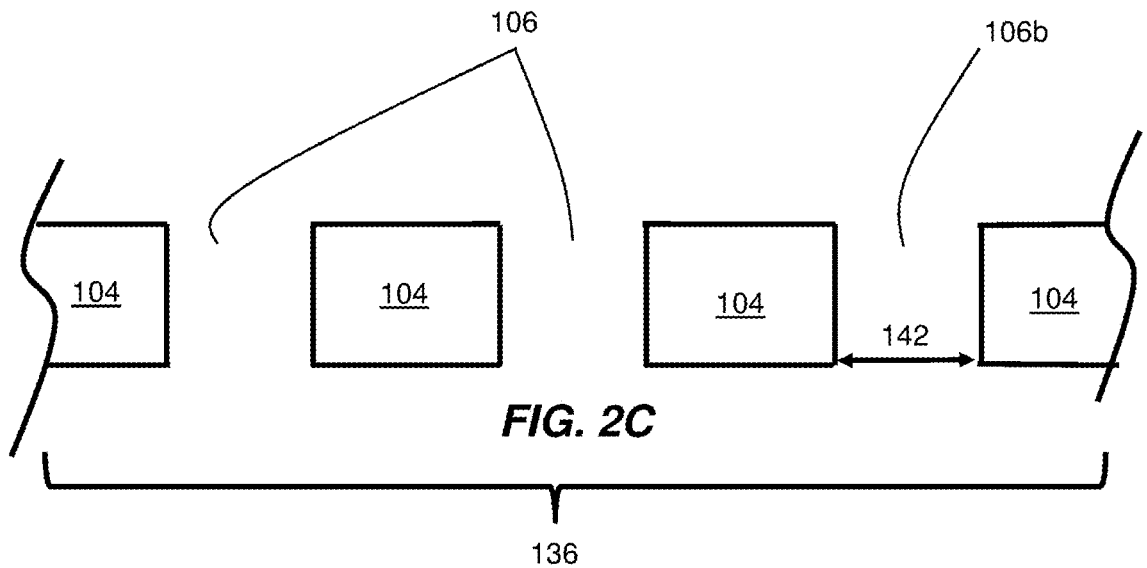
FIG. 2C is a cross-sectional schematic diagram of a porous wall portion of a conduit, according to certain embodiments.
Figure 2D:
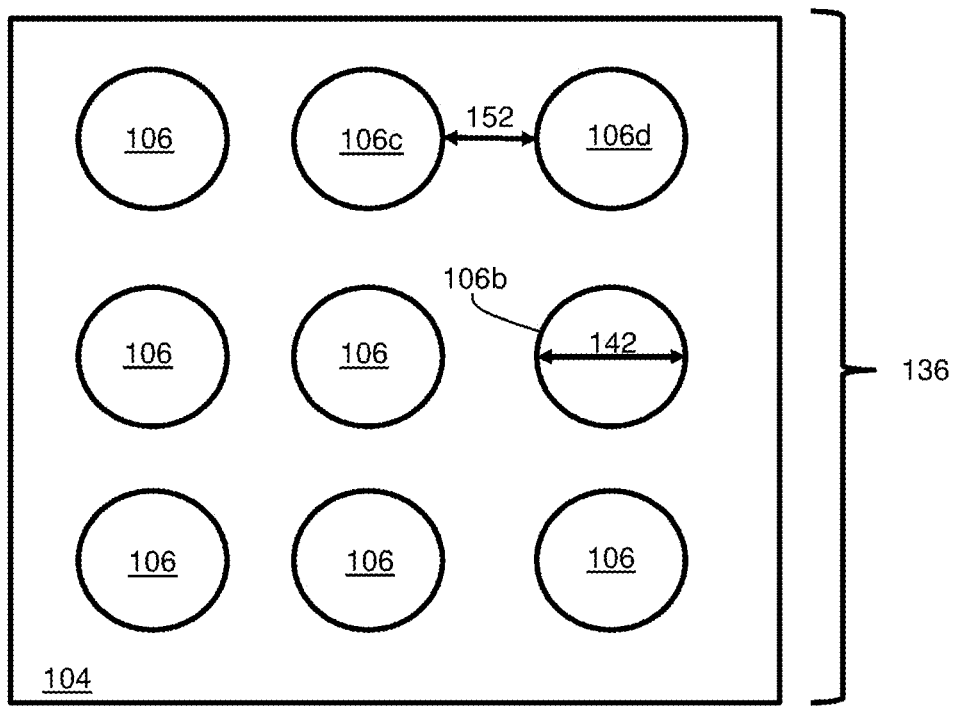
FIG. 2D is a top view schematic diagram of a porous wall portion of a conduit shown in FIG. 2C.

According to certain embodiments, the porous wall portion can be at least partially made up of milliscale pores. "Milliscale" is used herein in a manner consistent with its ordinary meaning in the art. Milliscale pores are pores having a minimum cross-section of greater than 100 micrometers and up to 10 millimeters. The minimum cross-section of a pore corresponds to the smallest cross-sectional dimension of the pore, as measured perpendicular to the length of the pore. FIG. 2C is a cross-sectional schematic diagram of a porous wall portion of a conduit, according to certain embodiments and FIG. 2D is a top view schematic diagram of a porous wall portion of a conduit shown in FIG. 2C. Referring to FIG. 2C, conduit 104 comprises porous wall portion 136 comprising pores 106 with minimum cross-section 142. It should be noted that, as used herein, the minimum cross-section of a pore through which gas is transported from bubbles into the interior of the conduit is different from the maximum height of a feature located on an external surface of the conduit. The minimum cross-section of a pore through which gas is transported from bubbles into the interior of the conduit is measured laterally relative to the conduit wall in which it is formed, as shown, for example, by minimum cross-section 142 in FIG. 2D. In contrast, the maximum height of a feature on the external surface of the conduit is measured perpendicularly to the wall on which it is formed as shown, for example, by maximum height 148 in FIG. 2A. The minimum cross-section of pores may be measured by electron microscopy techniques (e.g., scanning electron microscopy and/or transmission electron microscopy). The electron microscopy techniques can be supplemented by, for example, profilometry (e.g., optical or contact profilometers).

According to some embodiments, the minimum cross section of the milliscale pores is greater than 100 micrometers and up to 1 millimeter, greater than 100 micrometers and up to 200 micrometers, from 200 micrometers to 300 micrometers, from 300 micrometers to 500 micrometers, from 500 micrometers to 700 micrometers, from 700 micrometers to 1 millimeter, from 1 millimeter to 3 millimeters, from 3 millimeters to 5 millimeters, and/or from 5 millimeters to 10 millimeters. Combinations of the above cited ranges are also possible (e.g., from 300 micrometers to 700 micrometers, or from 200 micrometers to 1 millimeter).

According to certain embodiments, the porous wall portion can be at least partially made up of microscale pores. Microscale pores are pores having a minimum cross-section of from 1 micrometer to 100 micrometers. According to some embodiments, the minimum cross section of the microscale pores is from 1 micrometer to 10 micrometers, 10 micrometers to 20 micrometers, 20 micrometers to 30 micrometers, 30 micrometers to 50 micrometers, 50 micrometers to 70 micrometers, or 70 micrometers to 100 micrometers. Combinations of the above cited ranges are also possible (e.g., 30 micrometers to 70 micrometers, or 20 micrometers to 100 micrometers).

In certain embodiments, nanoscale pores are used. Nanoscale pores are pores from 1 nm to 1 micrometer in minimum cross-section. According to some embodiments, the minimum cross-section of the nanoscale pores is from 1 nm to 100 nm, 100 nm to 200 nm, 200 nm to 300 nm, 300 nm to 500 nm, 500 nm to 700 nm, or 700 nm to 1 micrometer. Combinations of the above cited ranges are also possible (e.g., 300 nm to 700 nm, or 200 nm to 1 micrometer).

According to certain embodiments, the pores may have any of a variety of suitable pore characteristic spacings. As used herein, the characteristic spacing of a particular pore refers to the shortest distance between the surface of the pore and the surface of that pore's nearest neighbor. For example, referring to FIG. 2D, the pore characteristic spacing of pore 106d is 152, the shortest distance between the surface of pore 106d and the surface of pore 106c. For a plurality of features, the pore average characteristic spacing refers to the number average of the pore characteristic spacings of the individual features.

According to some embodiments, the average pore characteristic spacing between the milliscale pores, when present, is at least 100 micrometers, at least 500 micrometers, at least 1 millimeter, at least 3 millimeters, at least 5 millimeters, or at least 9 millimeters. According to some embodiments, the average pore characteristic spacing between the microscale pores, when present, is at least 1 micrometer, at least 5 micrometers, at least 10 micrometers, at least 30 micrometers, at least 50 micrometers, or at least 90 micrometers. According to some embodiments, the average pore characteristic spacing between the microscale pores is less than or equal to 500 micrometers, less than or equal to 200 micrometers, less than or equal to 100 micrometers, less than or equal to 90 micrometers, less than or equal to 70 micrometers, less than or equal to 50 micrometers, less than or equal to 30 micrometers, less than or equal to 10 micrometers, or less than or equal to 5 micrometers. Combinations of these ranges are also possible (e.g., from 1 micrometer to 5 micrometers, from 5 micrometers to 10 micrometers, from 10 micrometers to 30 micrometers, from 30 micrometers to 50 micrometers, from 50 micrometers to 70 micrometers, from 70 micrometers to 90 micrometers, or from 90 micrometers to 100 micrometers).

According to some embodiments, the average pore characteristic spacing between the nanoscale pores, when present, is at least 1 nm, at least 10 nm, at least 50 nm, at least 100 nm, at least 200 nm, at least 300 nm, at least 500 nm, or at least 700 nm. According to some embodiments, the average pore characteristic spacing between the nanoscale pores, when present, is less than or equal to 1 micrometer, less than or equal to 700 nm, less than or equal to 500 nm, less than or equal to 300 nm, less than or equal to 200 nm, less than or equal to 100 nm, less than or equal to 50 nm, or less than or equal to 10 nm. Combinations of these ranges are also possible (e.g., from 1 nm to 100 nm, from 100 nm to 200 nm, from 200 nm to 300 nm, from 300 nm to 500 nm, from 500 nm to 700 nm, or from 700 nm to 1 micrometer).

According to certain embodiments, the pores may be relatively regularly spaced across the porous wall portion. This may be achieved, for example, by spacing the pores in a pattern. In some embodiments, the standard deviation of the nearest neighbor distances of the pores on the porous wall portion is less than 20% (or less than 10%, or less than 5%, or less than 2%, or less than 1%) of the number average of the nearest neighbor distances of the pores on the porous wall portion. This standard deviation can be determined by determining, for each pore, the nearest neighbor distance and comparing the standard deviation of those nearest neighbor distances to the number average of those nearest neighbor distances.

The conduit can be made of a variety of materials. According to certain embodiments, at least a portion of the conduit (e.g., at least 10%, at least 25%, at least 50%, at least 75%, at least 90%, or at least 99% of the surface area of the conduit) is made of metal(s), ceramic(s), polymer(s) (e.g., organic polymer(s)), and/or combinations thereof. For example, in certain embodiments, the conduit may comprise a metal (e.g. stainless steel) porous wall portion. Referring to FIG. 1C, in some embodiments, porous wall portion 136 may comprise stainless steel, while the rest of conduit 104 comprises a polymer.

According to some embodiments, at least a portion of the conduit is linear. For example, referring to FIG. 1C, linear portion 144 of conduit 104 is linear. In some cases, at least a portion of the conduit is nonlinear. As shown in FIG. 1C, linear portion 144 combined with nonlinear portion 146 is nonlinear.

The conduit can have a variety of suitable submerged geometric surface areas. The term "geometric surface area" refers to the area that would be measured macroscopically (for example, without counting contributions from pores, small-scale roughness, etc.) and can generally be understood as the total projected area. According to certain embodiments, the conduit has a submerged geometric surface area of at least 1 mm$^2$, at least 10 mm$^2$, at least 100 mm$^2$, at least 1,000 mm$^2$, at least 10,000 mm$^2$, at least 100,000 mm$^2$, or at least 1,000,000 mm$^2$. In certain embodiments, the conduit has a submerged geometric surface area of at least 1 mm$^2$.

According to certain embodiments, the pores (e.g., the milliscale, microscale, and/or nanoscale pores) of the porous wall portion are distributed over a geometric surface area of at least 1 mm$^2$, at least 10 mm$^2$, at least 100 mm$^2$, at least 1,000 mm$^2$, or at least 10,000 mm$^2$.

According to certain embodiments, the wall of the conduit that forms the external surface of the conduit has any of a variety of suitable thicknesses. In some embodiments, the wall of the conduit that forms the external surface of the conduit has a thickness of at least 10 μm.

According to certain embodiments, the internal gas passageway of the conduit has any of a variety of suitable diameters. In some embodiments, the internal gas passageway of the conduit has a diameter of at least 0.1 mm. According to certain embodiments, the internal gas passageway of the conduit has a diameter of at least 1 mm, at least 5 mm, at least 1 cm, at least 5 cm, or at least 10 cm.

The liquid phase of the bubble-containing liquid can have a variety of suitable compositions. In some embodiments, the liquid of the foam and/or the bubble-containing liquid comprises water. According to certain embodiments, the liquid of the foam and/or bubble-containing liquid comprises an aqueous solution. According to some embodiments, the bubble-containing liquid comprises oil, organic solvent(s), and/or blood. In other certain embodiments the bubble-containing liquid is a cell culture medium (e.g., Dulbecco's Modified Eagle Medium/Nutrient Mixture F-12-DMEM/F-12, and/or Buffered Glycerol-complex Medium/BMGY). Combinations of these liquids are also possible.

The source of bubbles may be any of a variety of suitable sources. According to certain embodiments, the source of bubbles is a bubble-producing conduit. For example, referring to FIG. 1A, system 100 comprises source of bubbles 118 (which is a bubble-producing conduit), which acts as the source of submerged bubbles 114 and layer bubble 116. In some such embodiments, the bubble-producing conduit is or is part of a sparger, a needle, a channel, a duct, a pipe, a tube, and/or a gutter.

According to certain embodiments, the source of bubbles is a chemical reaction (e.g., a gas evolution reaction, such as an acid-base reaction). FIG. 1B, is a cross-sectional schematic diagram of a system in which a surface is used to transport gas out of bubbles, according to some embodiments. Referring to FIG. 1B, system 100 can comprise a chemical reaction as a source of submerged bubbles 114 and layer bubble 116, according to certain embodiments. According to some embodiments, the product of the chemical reaction may be gaseous hydrocarbons such as gaseous alkanes (e.g., methane ($CH_4$), ethane ($C_2H_6$), propane ($C_3H_8$), butane ($C_4H_{10}$), etc.), $N_2$, $O_2$, CO, He, $H_2$, $CO_2$, Ar, and/or combinations of two or more of these.

According to certain embodiments, the source of bubbles may be present in solution prior to submerging the conduit into the bubble-containing liquid. For example, the conduit can be placed in a region where a layer of bubbles has already agglomerated (e.g., to form foam). In certain other embodiments, the source of bubbles may be added to the solution after the conduit is already present in the liquid (e.g., gas flows through a sparger present in a liquid after the conduit is already present).

According to certain embodiments, the surface can be used to eliminate bubbles (e.g., from a foam and/or a bubble containing liquid) at a relatively high rate. For example, in some embodiments, bubbles are eliminated at a rate of at least 10 bubbles per hour, at least 100 bubbles per hour, at least 1000 bubbles per hour, at least 10,000 bubbles per hour, or at least 100,000 bubbles per hour.

According to certain embodiments, the gas from within the bubbles comprises a first gas. For example, referring to FIG. 1A, submerged bubble 114 contains a first gas. The first gas within the bubbles can have any of a variety of suitable compositions. For example, in some embodiments, the gas from within the bubbles comprises one or more gaseous alkanes, helium, oxygen, nitrogen, carbon dioxide, carbon monoxide, argon, hydrogen, and/or combinations of two or more of these.

According to certain embodiments, the gaseous environment comprises a second gas. For example, referring to FIG. 1A, gaseous environment 122 comprises a second gas. The gaseous environment can contain any of a variety of suitable gases. According to certain embodiments, the gaseous environment comprises gaseous hydrocarbons such as gaseous alkanes (e.g., methane ($CH_4$), ethane ($C_2H_6$), propane ($C_3H_8$), butane ($C_4H_{10}$), etc.), $N_2$, $O_2$, CO, He, $H_2$, $CO_2$, Ar, and/or combinations of two or more of these (e.g., air, which is a combination of, primarily, $N_2$ and $O_2$). In certain, although not necessarily all embodiments, it can be advantageous to employ a gaseous environment that comprises air.

According to certain embodiments, the first gas (within the bubbles) and the second gas (of the gaseous environment) have essentially the same chemical composition. As used herein, two gases are said to have "essentially the same chemical composition" when at least 90% of the volumes of the gases are made up of the same chemicals. For example, according to certain embodiments, the second gas (e.g., the gaseous environment) may be a storage container for the harvested gas within bubbles.

According to some embodiments, the first gas and the second gas have different chemical compositions. As used herein, two gases are said to have "different chemical compositions" if they do not have essentially the same chemical composition. For example, in certain embodiments, the captured gas (e.g., methane) is released through the conduit into the atmosphere (e.g., air) at standard temperature and pressure.

In some embodiments, the liquid of the foam and/or bubble-containing liquid contains an additive. As used herein, "additive" is used to refer to anything in the bubble-containing liquid that is not the liquid, bubbles (or foam), or the surface being submerged into the bubble-containing liquid. In some embodiments, the additive comprises proteins, surfactants, and/or salts (e.g., alkali-metal salts). In certain embodiments, the bubble-containing liquid comprises an additive to prevent or reduce evaporation of the bubble-containing liquid. For example, in certain embodiments in which biochemical reactions are performed in the bubble-containing liquid, biological substances (e.g., proteins) can be used as an additive, which can stabilize the bubbles until a layer of foam is created. Other additives that can be used include, but are not limited to, sodium bicarbonate, sodium alkylbenzene sulfonate, sodium tripolyphosphate, tetrasodium pyrophosphate, and/or sodium carbonate. In some embodiments, the additive comprises a surfactant, such as a non-ionic surfactant. Non-limiting examples of water-soluble surfactants that may be present include those sold under the Tween® brand (also known as polysorbate), such as Tween® 20, Tween® 40, Tween® 60, Tween® 80, Tween® 21, Tween® 61, Tween® 81, Tween® 65, and Tween® 85. Non-limiting examples of oil-soluble surfactants that may be present include those sold under the Span® brand, such as Span® 20, Span® 40, Span® 60, Span® 80, Span® 65, and Span® 85. For example, referring to FIG. 1A and according to some embodiments, system 100 comprises additive 128 in bubble-containing liquid 102. It should be understood that the use of additives is optional, and in some embodiments, additives are not included in the bubble-containing liquid.

The systems and methods described herein can generally be used in a variety of applications. According to certain embodiments, systems and/or methods described herein can be used to reduce and/or eliminate foam formed as a by-product of a manufacturing processes. According to certain embodiments, systems and/or methods described herein can be used to reduce and/or eliminate foam formed as a by-product of a paper manufacturing process, a water treatment process, a food and/or beverage manufacturing process, and/or an agrochemical manufacturing process. In some embodiments, systems and/or methods described herein can be used to reduce and/or eliminate foam from a coating process (e.g., to reduce and/or eliminate foams that create defects in a coating layer). According to certain embodiments, systems and/or methods described herein can be used to reduce and/or eliminate foam in biochemical processes. This can be advantageous, in certain cases, because active ingredients (such as proteins) can become entrapped within foams such that they are no longer usable for the biochemical reaction. Also, in some biochemical processes in which bubbles carry gas which is essential to the biochemical reaction, those bubbles agglomerate within a separate foam layer and grow (e.g., to the extent that gas diffusion from them to the solution is negligible). Foam can also create inefficiencies through disruption of liquid flow, reduced efficiency of pumps, and/or overflow of reaction tanks.

Figure 5:
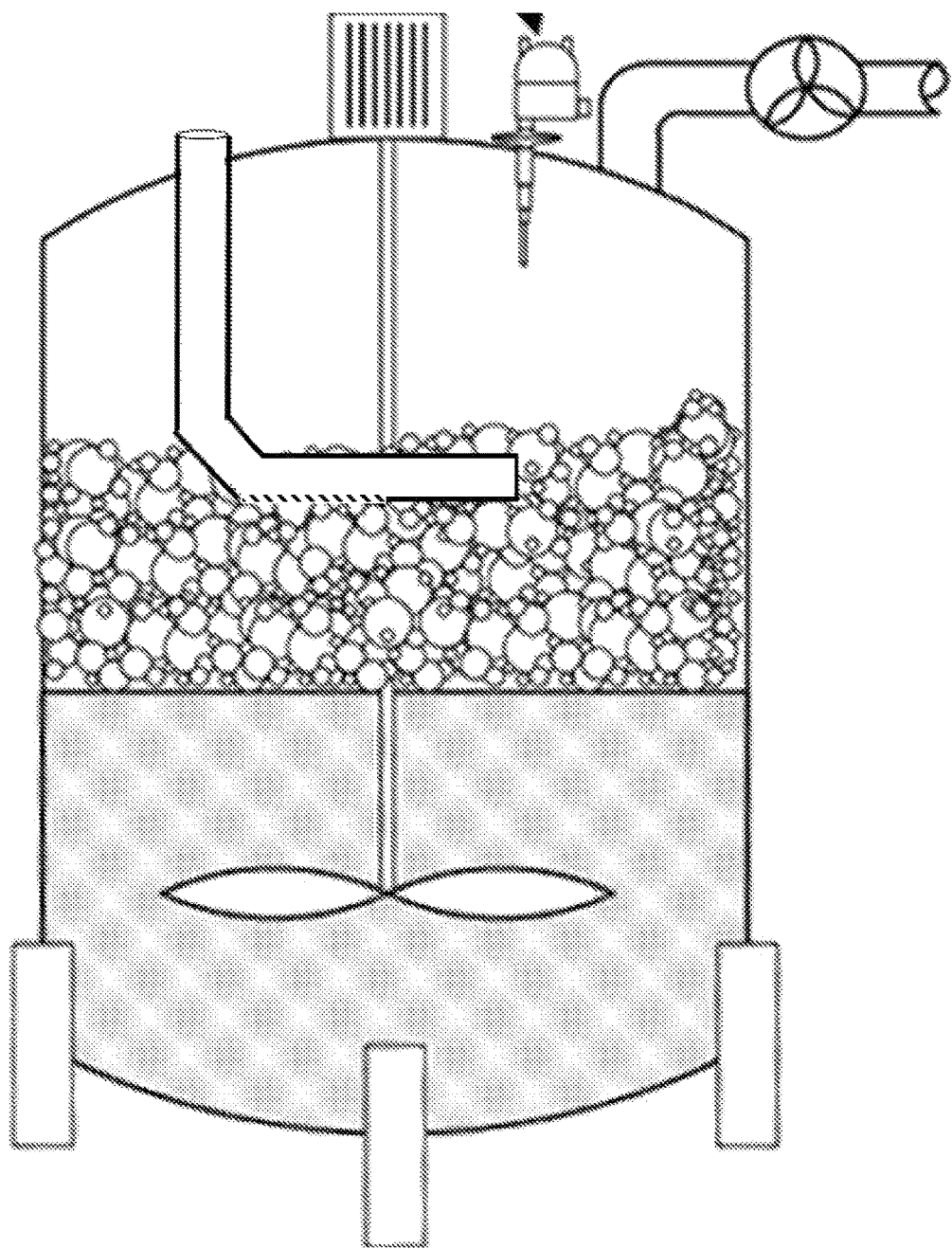
FIG. 5 is an exemplary schematic diagram illustrating a conduit that can be used to reduce foaming in a bubble-containing liquid within a bioreactor.

According to certain embodiments, the foam and/or bubble-containing liquid is located within a container. For example, in some embodiments, the foam and/or bubble-containing liquid is contained in a reactor, a bioreactor, or the like. For example, FIG. 5 is an exemplary schematic diagram illustrating a surface that can be used to reduce foam formation in a bubble-containing liquid within a bioreactor.

In certain embodiments, the foam and/or bubble-containing liquid is located within an external liquid source. According to some embodiments, the external liquid source is a swamp, reservoir, stream, canal, river, pond, lake, sea, and/or ocean.

U.S. Provisional Application No. 62/608,417, filed Dec. 20, 2017, and entitled "Bubble Gas Harvesting and/or Transport Methods and Associated Systems and Articles" is incorporated herein by reference in its entirety for all purposes.

The following examples are intended to illustrate certain embodiments of the present invention, but do not exemplify the full scope of the invention.

Example

Figure 7:
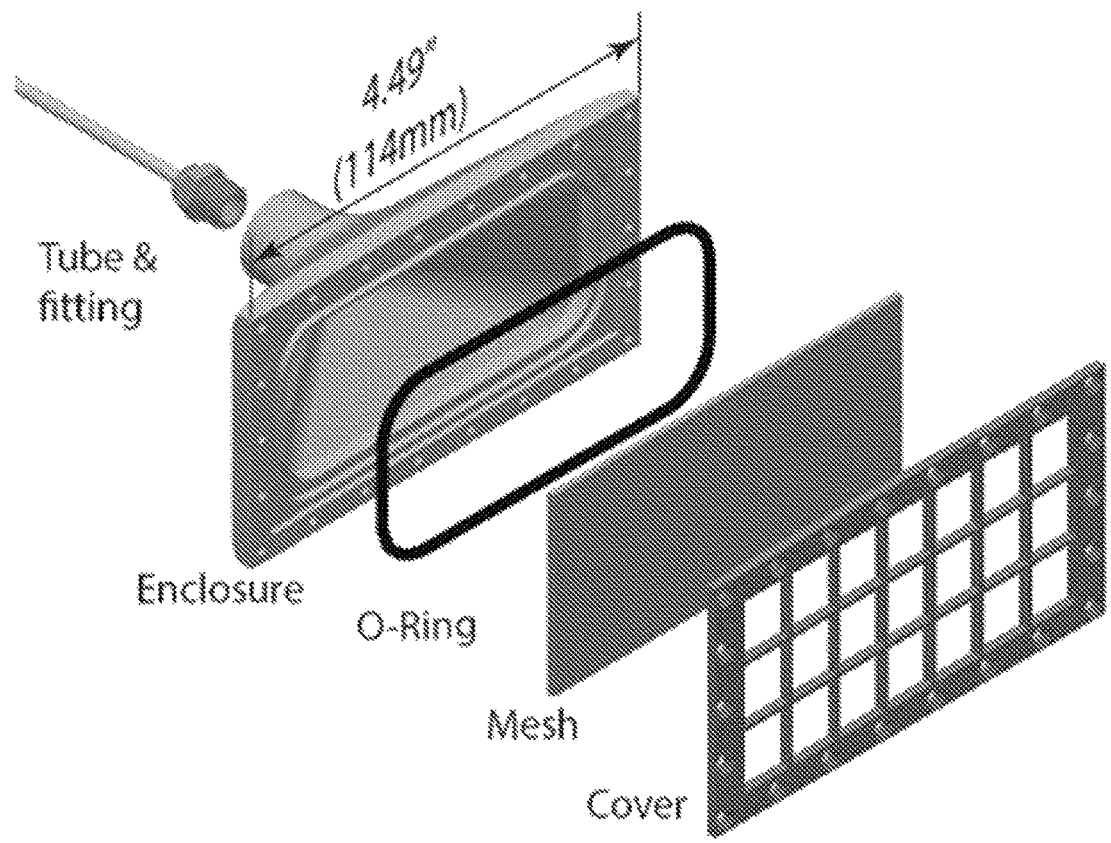
FIG. 7 is an exemplary schematic diagram of a conduit that can be used to transport and/or harvest gas within bubbles, according to certain embodiments.
Figure 8A:
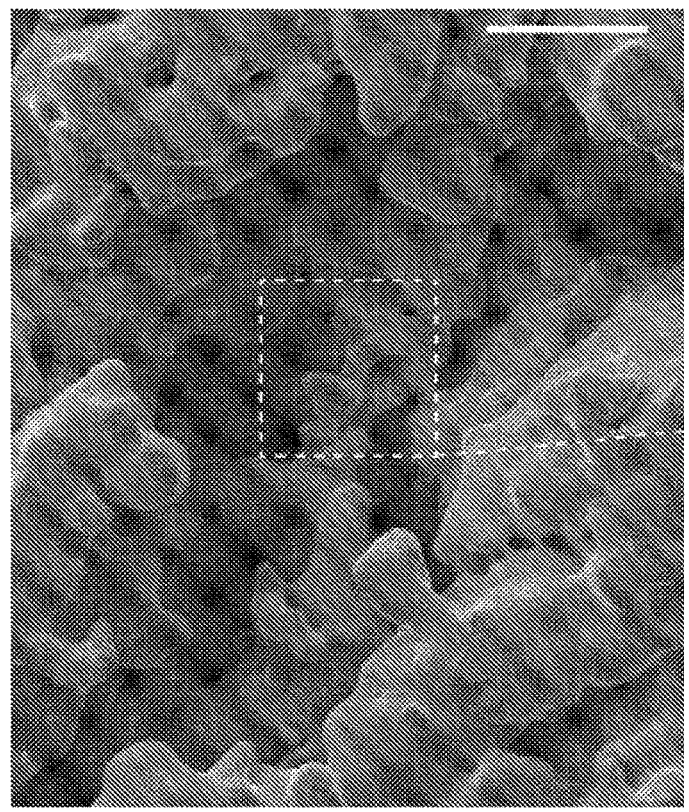
FIG. 8A is an SEM image (50 µm scale bar) of an exemplary external surface of a conduit.
Figure 8B:
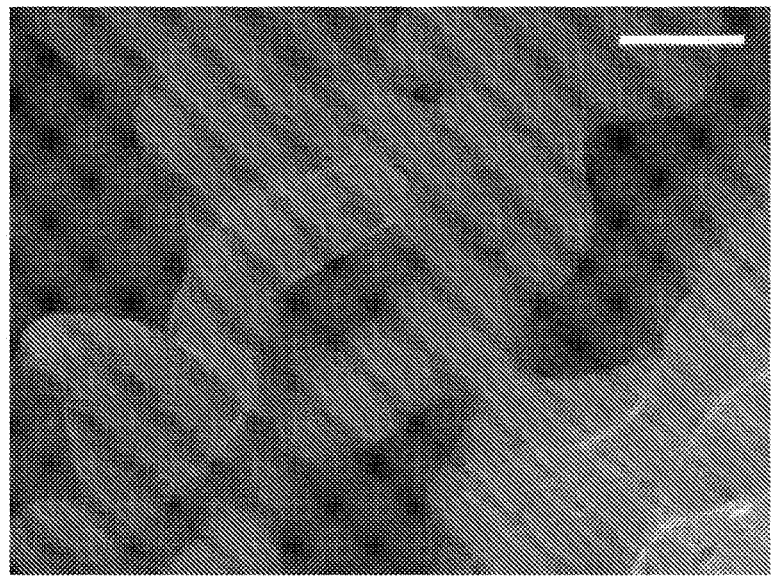
FIG. 8B is an SEM image (10 µm scale bar) of the external surface shown in FIG. 8A.
Figure 9:
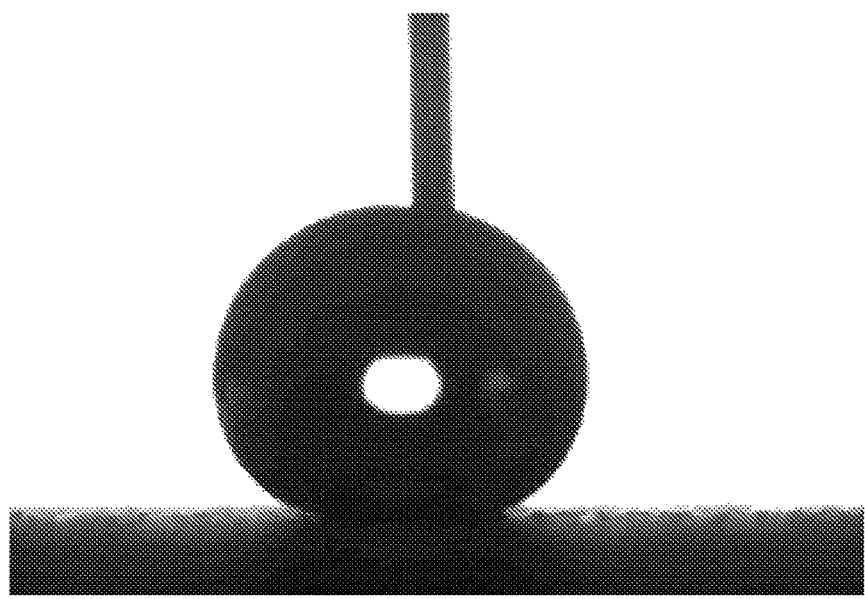
FIG. 9 is an image of the contact angle between the external surface of an exemplary conduit and liquid.

In this example, a conduit was used to transport gas out of bubbles of a bubble-containing liquid. A custom conduit containing a superhydrophobic porous mesh surface was submerged in a foam-containing aqueous solution (Millipore, resistivity of 18MΩ-cm) with 0.01% wt Alconox in order to transport gas out of the bubbles of the aqueous solution and inhibit further growth (and, eventually, the presence of) a foam layer. To assemble the conduit, a porous stainless steel (SST) mesh with average pore size of 20 μm (Wald Krause Engineering) was placed between two 3D printed plastic parts, which served as an enclosure and a cover, as shown in FIG. 7. The enclosure contained a sealing groove in which a Buna-N O-ring rubber seal (McMaster) was pressed against the SST mesh, which prevented the liquid from entering into the enclosure. A clear plastic tube (McMaster), which provided a gas pathway away from the aqueous solution the collected gas, was connected to the backside of the enclosure through a push to connect tube-to-thread fitting (McMaster). The SST mesh was characterized using SEM (JSM-6610LV) at an accelerating voltage of 20 kV to show its textures as shown in FIG. 8A (scale bar 50 μm), and FIG. 8B (scale bar 10 μm). Prior to assembly of the conduit, the SST mesh was coated with octadecylphosphonic acid (Sigma Aldrich) and a layer of nanoparticles using a two-step commercial product (NeverWet Multi-Surface Aerosol from NeverWet). This process rendered the SST mesh to be superhydrophobic with an average static contact angle of 155.5° as shown in FIG. 9 (needle diameter is 0.31 mm).

Figure 10A:
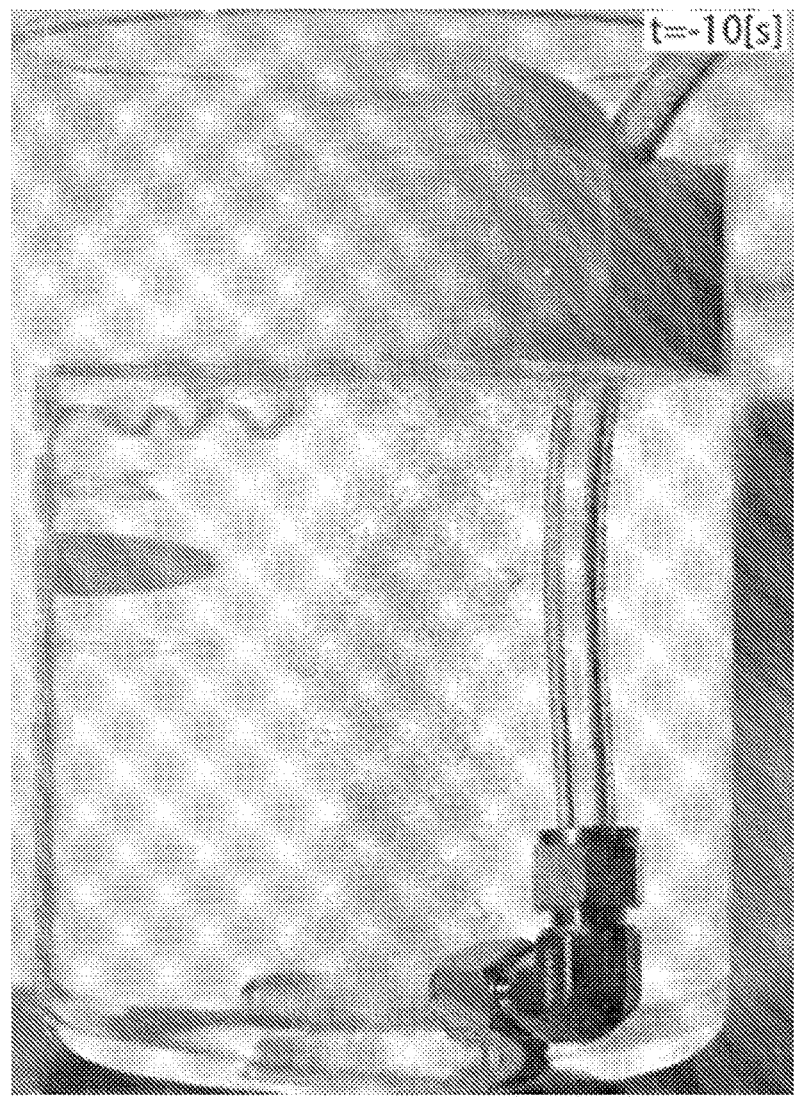
FIG. 10A is an image of a stable layer of foam, according to certain embodiments.
Figure 10B:
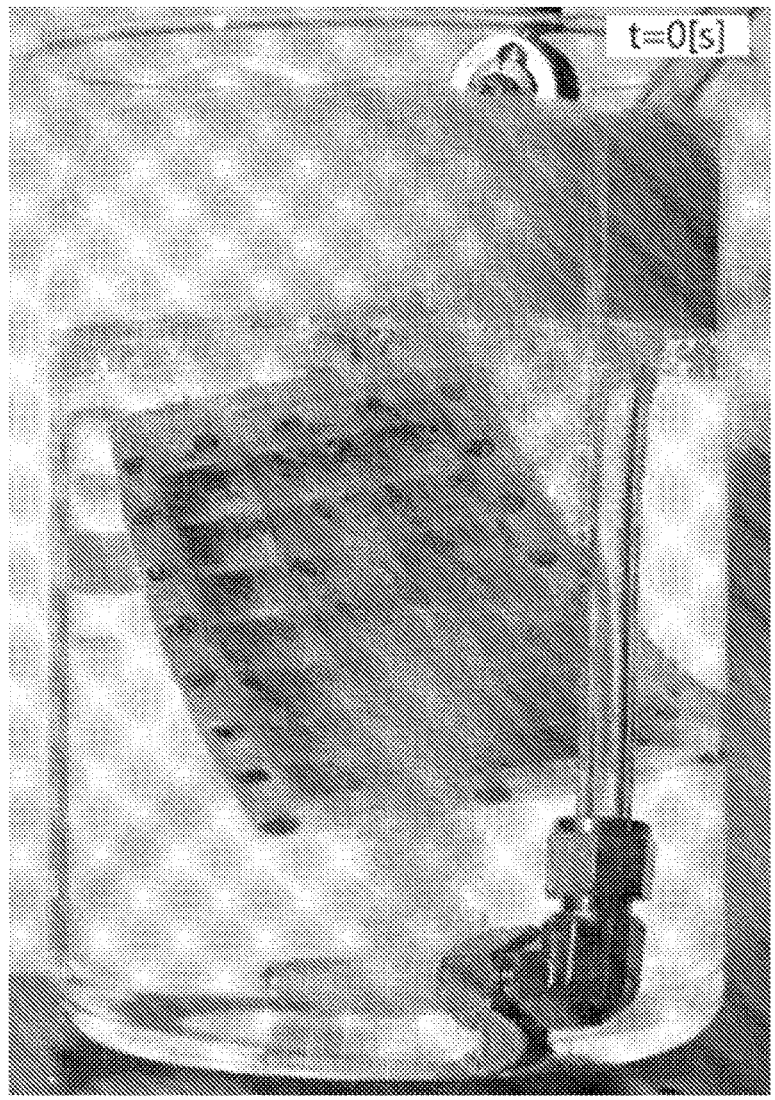
FIG. 10B is an image of a conduit at least partially submerged into a stable layer of foam, according to some embodiments.
Figure 10C:
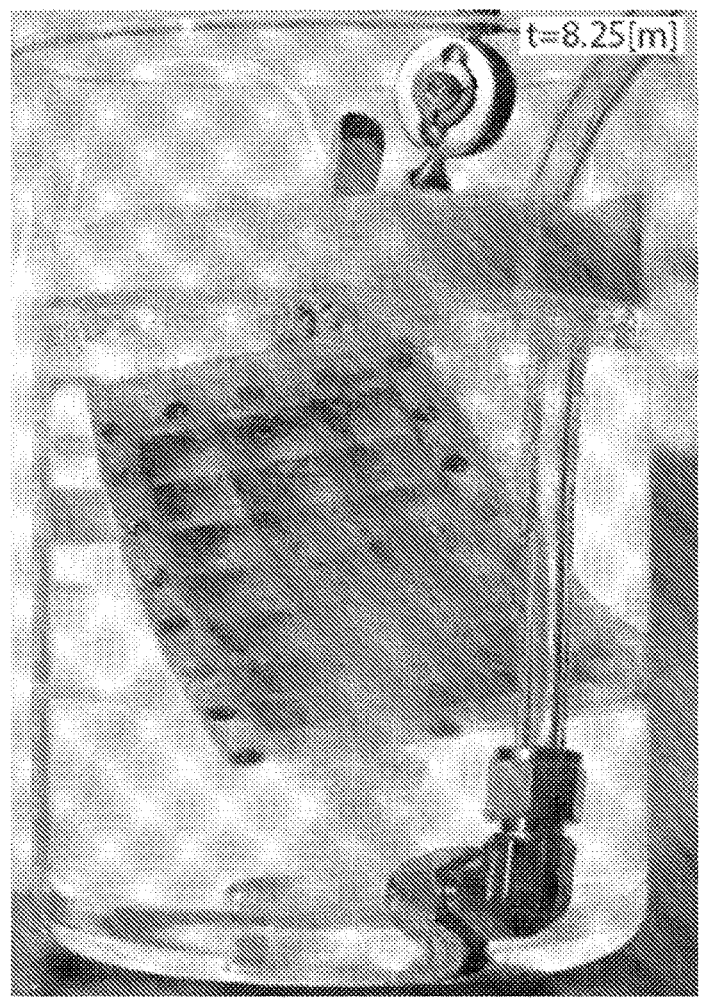
FIG. 10C is an image showing the effect of the conduit capturing gas from within bubbles, according to certain embodiments.
Figure 10D:
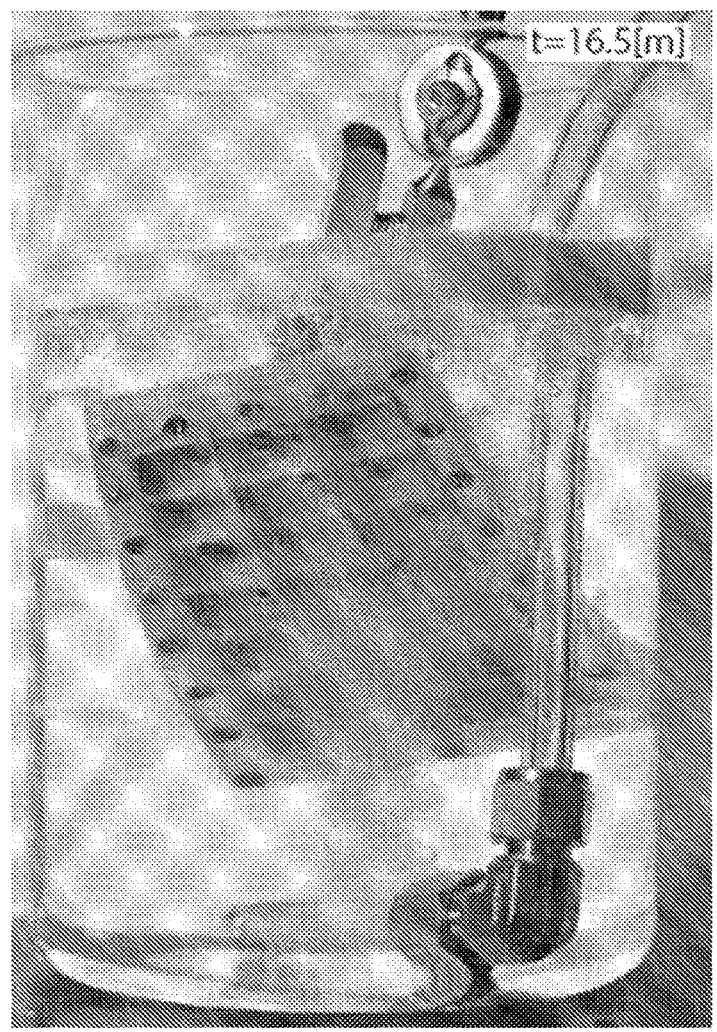
FIG. 10D is an image further showing the effect in FIG. 10C.

Air bubbles were introduced into the aqueous solution through a metallic sparger with an average pore size of 20 μm (Wald Krause Engineering), which was connected to house air supply. After 30 minutes of air introduction to the solution through the sparger, a stable layer of foam was created within the beaker as shown in FIG. 10A (beaker diameter is 13 cm). Then, the fabricated conduit was submerged into the solution so that only the plastic tube was left outside the beaker (FIG. 10B). The gas within the bubbles that hit the superhydrophobic SST mesh was absorbed by the mesh as it was more energetically favorable for the mesh to be in contact with air than the aqueous solution. Upon breaking, the bubbles released the entrapped gas, which was then translated through the mesh into the enclosure and through the plastic tube to the outer environment. These bubbles did not rise to the interface between the solution and the environment and therefore did not contribute to the foam layer. As a result, there was no influx of bubbles to sustain the foam layer, and the layer was reduced to a fraction of its size as shown in FIG. 10C-10D. The residual layer shown in FIG. 10D is a result of bubbles that due to convection induced by the flow of bubbles, did not come in contact with the SST mesh.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for transporting gas out of bubbles of a foam and/or bubbles of a bubble-containing liquid, comprising:
    at least partially submerging a conduit comprising an external surface into the foam and/or the bubble-containing liquid, wherein:
    the conduit comprises a porous wall portion, the porous wall portion comprising at least one submerged pore establishing a gaseous pathway from the external surface of the conduit, through the porous wall portion of the conduit, and to an internal gas passageway of the conduit,
    the at least one submerged pore is configured to restrict the transport of a liquid of the foam and/or the bubble-containing liquid through the wall portion, and
    the external surface of the conduit breaks liquid/gas interfaces of the bubbles of the foam and/or the bubbles of the bubble-containing liquid such that gas from within the bubbles of the foam and/or the bubbles of the bubble-containing liquid is transported from the bubbles, through the gaseous pathway, and into an interior of the conduit.

2. The method of claim 1, wherein the external surface of the conduit is non-wetting with respect to the liquid of the foam and/or the bubble-containing liquid.

3. The method of claim 1, wherein the gas from within the bubbles merges with the gaseous pathway from the external surface of the conduit, through the porous wall portion of the conduit, and to the internal gas passageway of the conduit.

4. The method of claim 3, wherein the gas from within the bubbles further merges with the internal gas passageway of the conduit.

5. The method of claim 4, wherein the gas from within the bubbles is further transported along the internal gas passageway of the conduit until the gas from within the bubbles enters a gaseous environment separate from the foam and/or bubble-containing liquid.

6. The method of claim 1, wherein the liquid of the foam and/or bubble-containing liquid comprises an aqueous solution.

7. The method of claim 1, wherein the external surface of the conduit comprises milliscale, microscale, and/or nanoscale features.

8. The method of claim 1, wherein the foam and/or bubble-containing liquid comprises a liquid phase and bubbles contained within the liquid phase.

9. The method of claim 1, wherein the external surface of the conduit comprises milliscale, microscale, and/or nanoscale protrusions.

10. The method of claim 1, wherein the conduit has a submerged geometric surface area of at least 1 mm².

11. The method of claim 1, wherein the internal gas passageway of the conduit has a diameter of at least 0.1 mm.

12. The method of claim 1, wherein the wall of the conduit that forms the external surface of the conduit has a thickness of at least 10 μm.

13. The method of claim 1, wherein at least a portion of the conduit is made of a metal, a ceramic, a polymer, and/or any combination thereof.

14. The method of claim 1, wherein the liquid of the foam and/or bubble-containing liquid contains an additive.

15. The method of claim 14, wherein the additive is a protein, surfactant, and/or salt.

16. The method of claim 1, wherein the gas from within the bubbles comprises one or more gaseous alkanes, helium, oxygen, nitrogen, carbon dioxide, carbon monoxide, argon, and/or hydrogen.

17. The method of claim 1, wherein the external surface is configured such that the external surface and the liquid of the foam and/or bubble-containing liquid satisfy the following relationship:

$$(1-\varphi)/(r-\varphi) < -\cos\theta,$$

wherein:
 $\varphi$ is the solid fraction of the external surface,
 r is the roughness of the external surface, and
 $\theta$ is the contact angle that would be made between the external surface and a droplet of the liquid of the foam and/or the bubble-containing liquid.

18. The method of claim 5, wherein the gas from within the bubbles comprises a first gas and the gaseous environment comprises a second gas.

19. The method of claim 5, wherein the gaseous environment comprises air.

* * * * *